US009258440B2

(12) United States Patent
Oda et al.

(10) Patent No.: US 9,258,440 B2
(45) Date of Patent: Feb. 9, 2016

(54) IMAGE FORMING APPARATUS, REMOTE OPERATION DEVICE, REMOTE CONTROL METHOD, REMOTE OPERATION METHOD, NON-TRANSITORY COMPUTER-READABLE RECORDING MEDIUM ENCODED WITH REMOTE CONTROL PROGRAM, AND NON-TRANSITORY COMPUTER-READABLE RECORDING MEDIUM ENCODED WITH REMOTE OPERATION PROGRAM FOR PERFORMING REMOTE OPERATION

(71) Applicant: Konica Minolta, Inc., Chiyoda-ku (JP)

(72) Inventors: Akihiko Oda, Toyohashi (JP); Manabu Furukawa, Nagaokakyo (JP); Hiroki Tajima, Toyokawa (JP); Kenzo Yamamoto, Toyohashi (JP); Hiroki Ueda, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/336,449

(22) Filed: Jul. 21, 2014

(65) Prior Publication Data

US 2015/0029529 A1 Jan. 29, 2015

(30) Foreign Application Priority Data

Jul. 26, 2013 (JP) .................................. 2013-155918

(51) Int. Cl.
*H04N 1/00* (2006.01)
*G06F 3/12* (2006.01)

(52) U.S. Cl.
CPC .......... *H04N 1/00352* (2013.01); *G06F 3/1205* (2013.01); *G06F 3/1253* (2013.01); *G06F 3/1292* (2013.01); *H04N 1/00315* (2013.01)

(58) Field of Classification Search
CPC .......... H04N 1/00352; H04N 1/00315; G06F 3/1203; G06F 3/1273; G06F 3/1268

USPC .............................................. 358/1.15, 1.18
See application file for complete search history.

(56) References Cited

U.S. PATENT DOCUMENTS

| 5,798,738 A | 8/1998 | Yamada |
| 6,104,499 A | 8/2000 | Yamada |

(Continued)

FOREIGN PATENT DOCUMENTS

| JP | 08-329005 A | 12/1996 |
| JP | 2002-281195 A | 9/2002 |

(Continued)

OTHER PUBLICATIONS

Office Action (Notice of Ground of Rejection) issued on Jul. 14, 2015, by the Japanese Patent Office in corresponding Japanese Patent Application No. 2013-155918 and an English translation of the Office Action. (9 pages).

*Primary Examiner* — Benny Q Tieu
*Assistant Examiner* — Quyen V Ngo
(74) *Attorney, Agent, or Firm* — Buchanan Ingersoll & Rooney PC

(57) ABSTRACT

An image forming apparatus includes: a setting information transmitting portion to transmit setting information including a setting screen stored in a screen storage area, screen identification information thereof, and a setting value stored in a setting value storage area to a remote operation device; a remote setting portion to, in response to remote operation information being received after transmission of the setting information, update the setting value stored in the setting value storage area with a setting value included in the remote operation information; and a remote setting screen update portion to generate a setting screen based on the setting value stored in the setting value storage area and update the setting screen stored in the setting screen storage area, after the setting value is updated. An operation is specified based on positional information included in the remote operation information in the updated setting screen.

23 Claims, 10 Drawing Sheets

(56) References Cited

U.S. PATENT DOCUMENTS

| | | | |
|---|---|---|---|
| 7,126,587 B2* | 10/2006 | Kawakami et al. | 345/168 |
| 7,603,189 B2* | 10/2009 | Tanaka et al. | 700/83 |
| 8,571,602 B2* | 10/2013 | Horton et al. | 455/557 |
| 2006/0120616 A1* | 6/2006 | Kita | 382/254 |
| 2007/0256020 A1* | 11/2007 | Haga | 715/741 |
| 2008/0231914 A1* | 9/2008 | Motoyoshi | 358/474 |
| 2009/0103124 A1* | 4/2009 | Kimura et al. | 358/1.15 |
| 2009/0235179 A1* | 9/2009 | Singh et al. | 715/744 |
| 2011/0058202 A1* | 3/2011 | St. Jacques, Jr. et al. | 358/1.13 |
| 2012/0062947 A1 | 3/2012 | Shozaki | |
| 2012/0212761 A1* | 8/2012 | Kuroyanagi | 358/1.13 |
| 2013/0111238 A1* | 5/2013 | Takahashi et al. | 713/320 |
| 2013/0127725 A1* | 5/2013 | Sugimoto | 345/168 |
| 2013/0235414 A1* | 9/2013 | Iwamoto et al. | 358/1.14 |

FOREIGN PATENT DOCUMENTS

| | | |
|---|---|---|
| JP | 2006-086642 A | 3/2006 |
| JP | 2006-140898 A | 6/2006 |
| JP | 2008-219351 A | 9/2008 |
| JP | 2011-097460 A | 5/2011 |
| JP | 2011-238006 A | 11/2011 |
| JP | 2012-061669 A | 3/2012 |

* cited by examiner

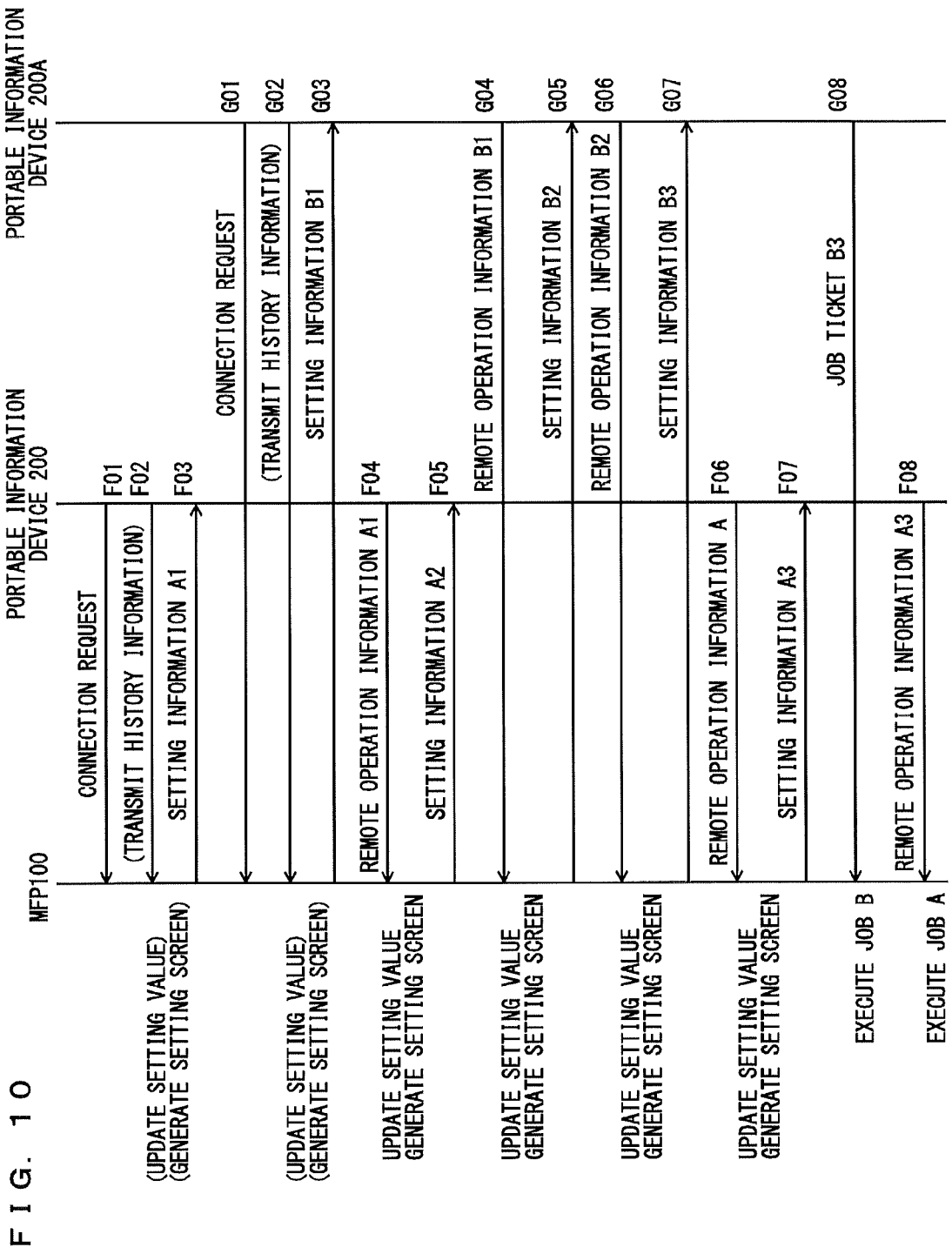

US 9,258,440 B2

IMAGE FORMING APPARATUS, REMOTE OPERATION DEVICE, REMOTE CONTROL METHOD, REMOTE OPERATION METHOD, NON-TRANSITORY COMPUTER-READABLE RECORDING MEDIUM ENCODED WITH REMOTE CONTROL PROGRAM, AND NON-TRANSITORY COMPUTER-READABLE RECORDING MEDIUM ENCODED WITH REMOTE OPERATION PROGRAM FOR PERFORMING REMOTE OPERATION

This application is based on Japanese Patent Application No. 2013-155918 filed with Japan Patent Office on Jul. 26, 2013, the entire content of which is hereby incorporated by reference.

BACKGROUND OF THE INVENTION

1. Field of the Invention

The present invention relates to an image forming apparatus, a remote operation device, a remote control method, a remote operation method, a non-transitory computer-readable recording medium encoded with a remote control program, and a non-transitory computer-readable recording medium encoded with a remote operation program. More specifically, the present invention relates to an image forming apparatus remotely controlled by a remote operation device, a remote control method performed in the image forming apparatus, a non-transitory computer-readable recording medium encoded with a remote control program, a remote operation device remotely controlling the image forming apparatus, a remote operation method performed in the remote operation device, and a non-transitory computer-readable recording medium encoded with a remote operation program.

2. Description of the Related Art

Technologies for remotely operating MFPs (Multi Function Peripherals) with portable information devices such as smart phones are known. For example, Japanese Patent Laid-Open No. 2006-086642 describes an image forming apparatus which distributes a Web page to a terminal device of the image forming apparatus. The image forming apparatus includes operation screen control means for controlling an operation screen appearing on the display screen of the image forming apparatus and an operation screen appearing as the Web page on the display screen of the terminal device of the image forming apparatus such that while one of the operation screens is being used, the use of the other operation screen is restricted.

In the conventional image forming apparatus, however, one of a direct operating user who directly operates the image forming apparatus from the operation panel of the image forming apparatus and a remote operating user who remotely operates the image forming apparatus with the terminal device can operate the image forming apparatus, but the direct operating user and the indirect operating user cannot make different settings on the image forming apparatus.

SUMMARY OF THE INVENTION

According to an aspect of the present invention, an image forming apparatus is remotely controlled by a remote operation device and includes: an operation accepting portion to accept an operation input by a user; a storage portion including a setting value storage area for storing a setting value and a setting screen storage area for storing a setting screen: and a remote control portion to be remotely controlled by the remote operation device. The remote control portion includes a setting information transmitting portion to transmit to the remote operation device setting information including the setting screen stored in the screen storage area, screen identification information for identifying the setting screen, and the setting value stored in the setting value storage area, a remote operation information receiving portion to receive from the remote operation device remote operation information including screen identification information, a setting value, and positional information indicating a position in a setting screen identified by the screen identification information, after transmission of the setting information, a remote setting portion to update the setting value stored in the setting value storage area with the setting value included in the remote operation information in response to the remote operation information being received, and a remote setting screen update portion to generate a setting screen specified by the screen identification information included in the received remote operation information, based on the setting value stored in the setting value storage area, and update the setting screen stored in the setting screen storage area with the generated setting screen, after the setting value is updated by the remote setting portion. The operation accepting portion includes a remote operation specifying portion to specify an operation based on a position specified by the positional information included in the remote operation information in the setting screen updated by the remote setting screen update portion.

According to another aspect of the present invention, a remote operation device is capable of remotely controlling an image forming apparatus and includes: an operation accepting portion to accept an operation by a user; a setting information receiving portion to receive from the image forming apparatus setting information including a setting screen for remotely operating the image forming apparatus, screen identification information for identifying the setting screen, and a setting value; a setting screen display portion to, in response to the setting information being received, display the setting screen included in the received setting information; a position detection portion to, if the operation accepting portion accepts a user's operation of pointing on the setting screen displayed by the setting screen display portion, detect a position pointed in the setting screen; and a remote operation transmitting portion to, in response to a position in the setting screen being detected by the position detection portion, transmit to the image forming apparatus remote operation information including the screen identification information and the setting value included in the received setting information and positional information indicating the detected position in the setting screen.

According to a further aspect of the present invention, a remote control method is performed in an image forming apparatus remotely controlled by a remote operation device. The image forming apparatus includes a storage portion including a setting value storage area for storing a setting value and a setting screen storage area for storing a setting screen. The method includes: an operation accepting step of accepting an operation input by a user; and a remote control step of being remotely controlled by the remote operation device. The remote control step includes a setting information transmitting step of transmitting to the remote operation device setting information including the setting screen stored in the screen storage area, screen identification information for identifying the setting screen, and the setting value stored in the setting value storage area, a remote operation information receiving step of receiving from the remote operation device remote operation information including screen identification information, a setting value, and positional information indicating a position in the setting screen identified by the screen identification information, after transmission of the setting information, a remote setting step of updating the setting value stored in the setting value storage area with the setting value included in the remote operation information, in response to the remote operation information being received, and a remote setting screen update step of generating a setting screen specified by the screen identification information included in the received remote operation information based on the setting value stored in the setting value storage area, and updating the setting screen stored in the setting screen storage area with the generated setting screen, after the setting value is updated in the remote setting step. The operation accepting step includes a remote operation specifying step of specifying an operation based on a position specified by the positional information included in the remote operation information in the setting screen updated by the remote setting screen update step.

According to a still further aspect of the present invention, a non-transitory computer-readable recording medium is encoded with a remote control program causing a computer controlling the image forming apparatus to perform the remote control method as described above.

According to yet another aspect of the present invention, a remote operation method is performed in a remote operation device capable of remotely controlling an image forming apparatus. The method includes: an operation accepting step of accepting an operation by a user; a setting information receiving step of receiving from the image forming apparatus setting information including a setting screen for remotely operating the image forming apparatus, screen identification information for identifying the setting screen, and a setting value; a setting screen display step of, in response to the setting information being received, displaying the setting screen included in the received setting information; a position detection step of, if a user's operation of pointing on the setting screen displayed in the setting screen display step is accepted in the operation accepting step, detecting a position pointed in the setting screen; and a remote operation transmitting step of, in response to a position in the setting screen being detected in the position detection step, transmitting to the image forming apparatus remote operation information including the screen identification information and the setting value included in the received setting information and positional information indicating the detected position in the setting screen.

According to another aspect of the present invention, a non-transitory computer-readable recording medium is encoded with a remote operation program causing a computer controlling the remote operation device to perform the remote operation described above.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 10 is a diagram showing an example of the time flow of information exchanged between the portable information device and the MFP in the print system in the present embodiment.

DESCRIPTION OF THE PREFERRED EMBODIMENTS

Embodiments of the present invention will be described below in conjunction with the figures. In the following description, the same parts are denoted with the same reference signs. Their names and functions are also the same, and a detailed description thereof is not repeated.

Figure 1:
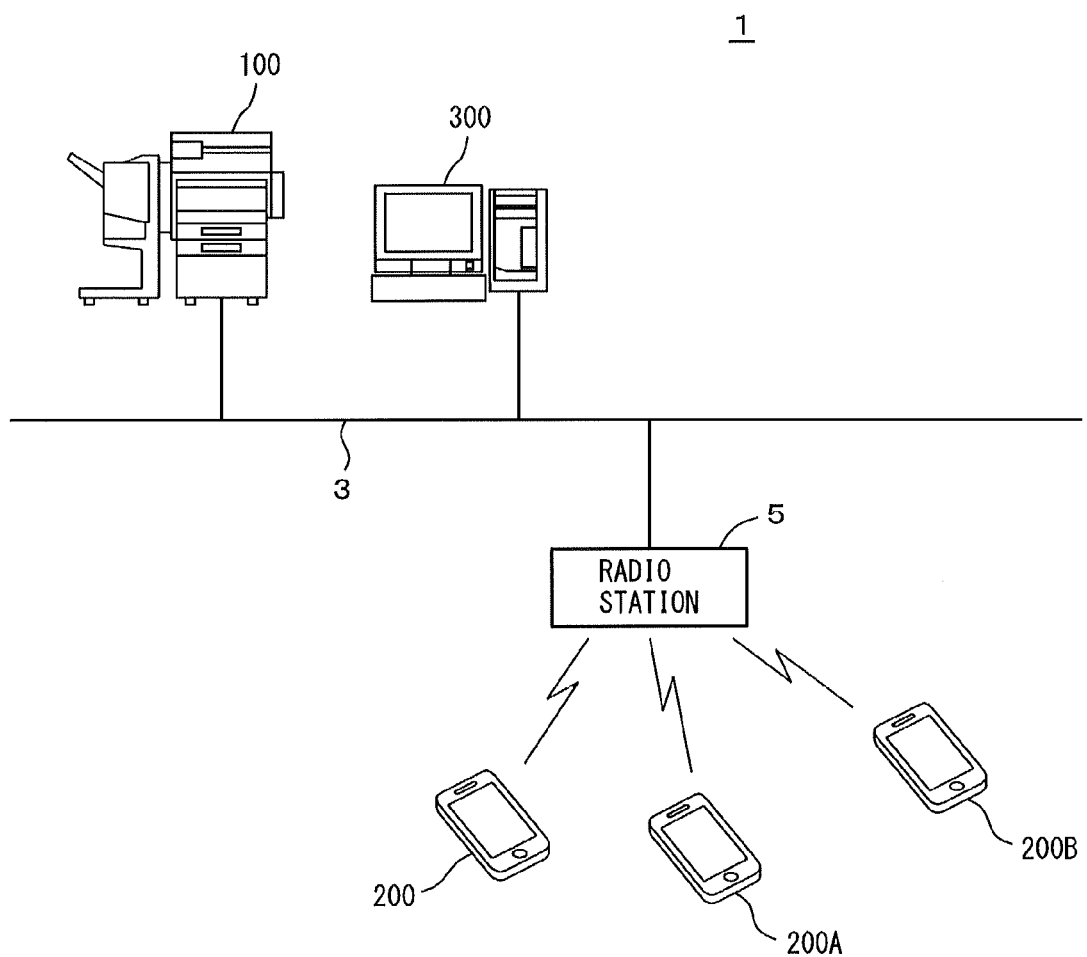
FIG. 1 is a diagram showing an overview of a print system in an embodiment of the present invention.

FIG. 1 is a diagram showing an overview of a print system in an embodiment of the present invention. Referring to FIG. 1, print system 1 includes a Multi Function Peripheral (hereinafter referred to as "MFP") 100 which functions as an image processing apparatus, a Personal Computer (hereinafter referred to as "PC") 300, a radio station 5, and portable information devices 200, 200A, 200B. MFP 100 and PC 300 are connected to a network 3. Portable information devices 200, 200A, 200B are connected to network 3 through radio station 5.

Network 3 is a Local Area Network (LAN), either wired or wireless. Network 3 is not limited to a LAN but may be a Wide Area Network (WAN), a Public Switched Telephone Network (PSTN), the Internet, or the like.

PC 300 is a general computer. PC 300 is installed with a printer driver program compatible with MFP 100. The printer driver program is executed to control MFP 100 and allow MFP 100 to execute an image forming process, a document scanning process, or other processes.

Portable information devices 200, 200A, 200B are computers carried by users, such as smart phones and PDAs (Personal Digital Assistants). Portable information devices 200, 200A, 200B have the same hardware configuration and functions, and portable information device 200 will be taken as an example in the following description, unless otherwise specified. Here, portable information device 200 is a smart phone and has a wireless LAN function and a call function. Portable information device 200 can communicate with a mobile phone base station by radio to connect to a mobile phone network and make a call.

In print system 1 in the present embodiment, portable information device 200 is installed with a remote operation program for remotely controlling MFP 100 and functions as a remote operation device that remotely controls MFP 100. When a user who operates portable information device 200 inputs a remote operation, portable information device 200 transmits a remote control command to MFP 100. MFP 100 is installed with a remote control program for receiving a remote control command from portable information device 200 and executing a process in accordance with the received remote control command. In the present embodiment, the remote operation program for remotely controlling MFP 100 is installed in portable information device 200, by way of example. However, the remote operation program for remotely controlling MFP 100 may be installed in PC 300. In this case, the user can remotely control MFP 100 using PC 300 in the same manner as in the case where portable information device 200 is used to remotely control MFP 100.

Figure 2:
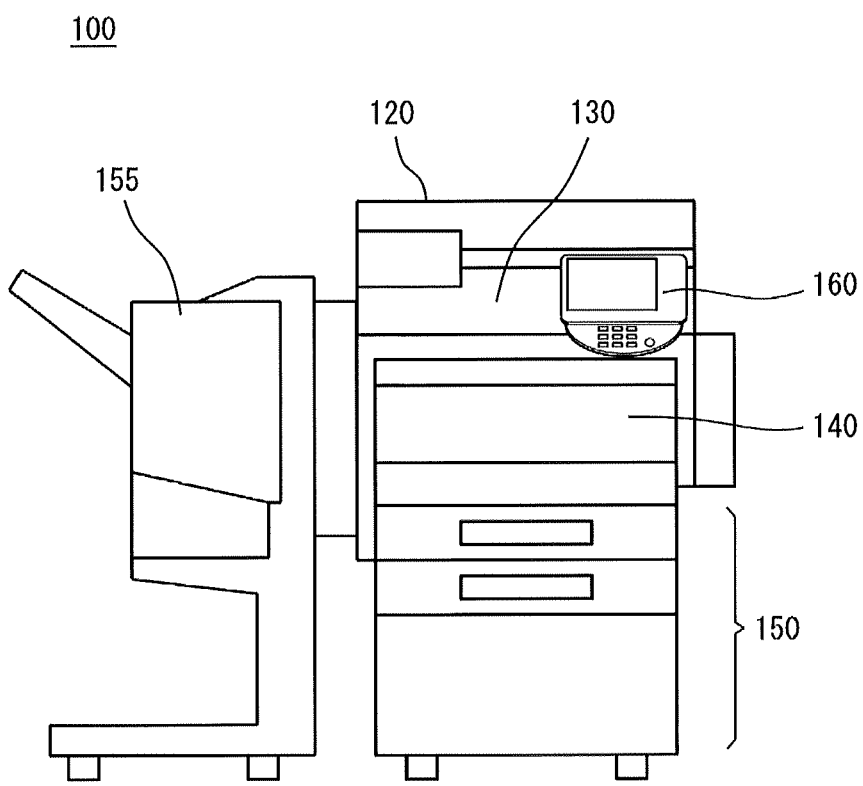
FIG. 2 is an external perspective view of an MFP.
Figure 3:
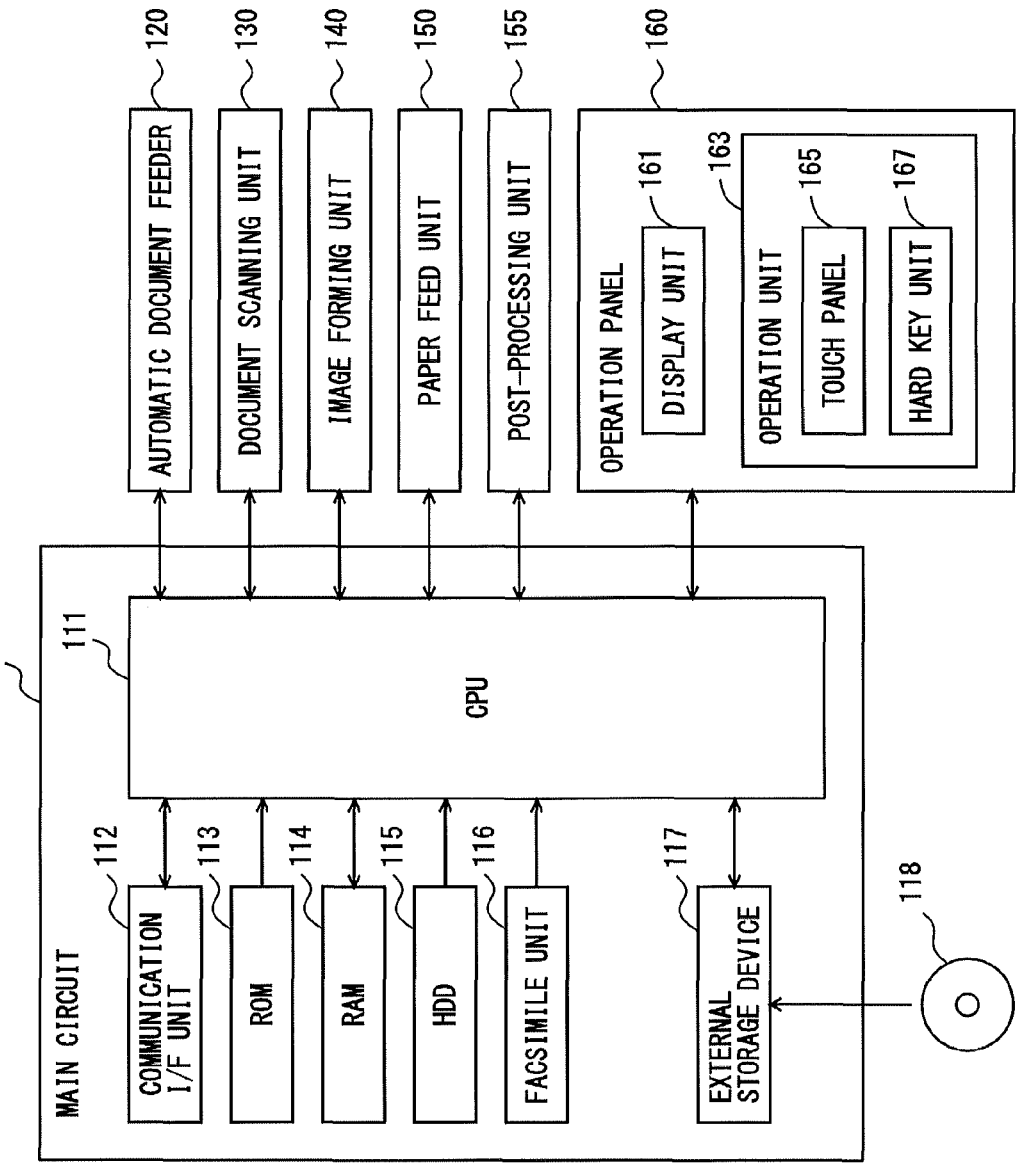
FIG. 3 is a block diagram showing an overall hardware configuration of the MFP.

FIG. 2 is an external perspective view of the MFP. FIG. 3 is a block diagram showing an overall hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on paper or the like based on image data output by document scanning unit 130 scanning a document, a paper feed unit 150 for supplying paper to image forming unit 140, a post-processing unit 155 for processing paper having an image formed thereon, and an operation panel 160 as a user interface.

The post-processing unit 155 executes a sorting process of sorting one or more sheets of paper having an image formed by image forming unit 140 and outputting the sorted paper, a punching process of punching a hole, and a stapling process of stapling paper.

The main circuit 110 includes a CPU 111, a communication interface (I/F) unit 112, a ROM 113, a RAM 114, a Hard Disk Drive (HDD) 115 as a mass storage device, a facsimile unit 116, and an external storage device 117 to which a CD-ROM 118 is attached. CPU 111 is connected to automatic document feeder 120, document scanning unit 130, image forming unit 140, paper feed unit 150, post-processing unit 155, and operation panel 160 to centrally control MFP 100.

ROM 113 stores a program executed by CPU 111 or data necessary to execute the program. RAM 114 is used as a work area when CPU 111 executes a program. RAM 114 includes a setting value storage area and a setting screen storage area. The setting value storage area is an area for storing a setting value for executing a process. The setting screen storage area is an area for storing a setting screen appearing on display unit 161. RAM 114 temporarily stores scan data (image data) successively sent from document scanning unit 130.

Operation panel 160 is provided on the top surface of MFP 100 and includes a display unit 161 and an operation unit 163. Display unit 161 is a display device such as an LCD (Liquid Crystal Display) or an organic ELD (Electro-Luminescence Display) and displays instruction menus to users, information about the acquired image data, and other information. Operation unit 163 includes a hard key unit 167 including a plurality of keys and accepts input of a variety of instructions and data such as characters and numerals through the user's operation corresponding to the keys. Operation unit 163 further includes a touch panel 165 provided on display unit 161.

Communication I/F unit 112 is an interface for connecting MFP 100 to network 3. CPU 111 communicates with PC 300 or portable information device 200, 200A, 200B through communication I/F unit 112 to transmit/receive data. Communication I/F unit 112 can also communicate with a computer connected to the Internet through network 3.

Facsimile unit 116 is connected to a PSTN to transmit facsimile data to the PSTN or receive facsimile data from the PSTN. Facsimile unit 116 stores the received facsimile data into HDD 115 or outputs it to image forming unit 140. Image forming unit 140 prints the facsimile data received from facsimile unit 116 on paper. Facsimile unit 116 also converts data stored in HDD 115 into facsimile data and transmits the converted facsimile data to a facsimile machine connected to the PSTN.

CD-ROM (Compact Disk ROM) 118 is attached to external storage device 117. CPU 111 can access CD-ROM 118 through external storage device 117. CPU 111 loads the program recorded on CD-ROM 118 attached to external storage device 117 into RAM 114 for execution. The program executed by CPU 111 can be stored not only in CD-ROM 118 but also in other medium such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 118. A program stored in HDD 115 may be loaded into RAM 114 for execution. In this case, another computer connected to network 3 may overwrite the program stored in HDD 115 of MFP 100 or additionally write a new program. MFP 100 may download a program from another computer connected to network 3 and store the program into HDD 115. The program referred to here includes not only a program directly executable by CPU 111 but also a source program, a compressed program, and an encrypted program.

Figure 4:
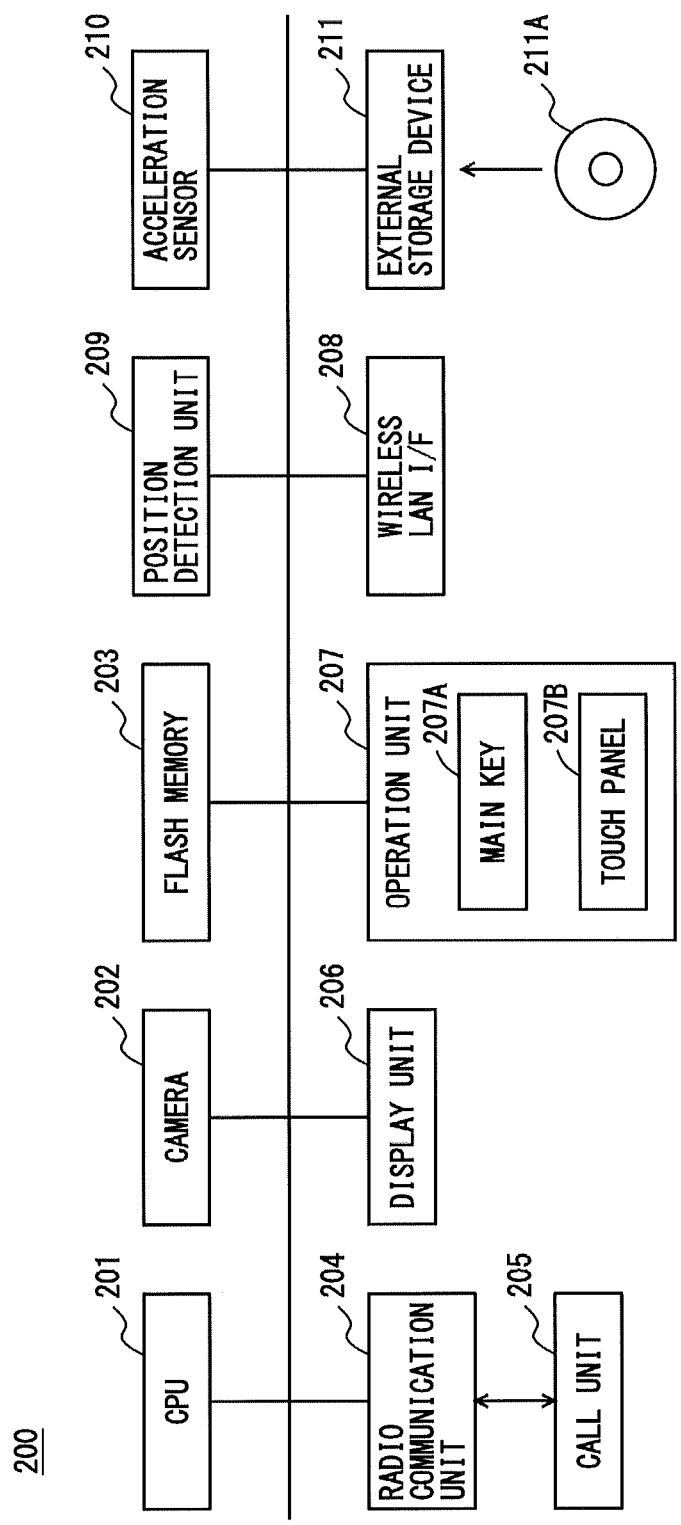
FIG. 4 is a block diagram showing an overall hardware configuration of a portable information device.

FIG. 4 is a block diagram showing an overall hardware configuration of the portable information device. Referring to FIG. 4, portable information device 200 in the present embodiment includes a CPU 201 for centrally controlling portable information device 200, a camera 202, a flash memory 203 for storing data in a nonvolatile manner, a radio communication unit 204 connected to a call unit 205, a display unit 206 displaying information, an operation unit 207 accepting the user's operation, a wireless LAN I/F 208, a position detection unit 209, an acceleration sensor 210, and an external storage device 211.

Display unit 206 is a display device such as an LCD or an organic ELD and displays instruction menus to users, information about the acquired image data, and other information. Operation unit 207 includes a main key 207A and a touch panel 207B. When the user points on the display surface of display unit 206, operation unit 207 outputs the position in the display surface detected by touch panel 207B to CPU 201. CPU 201 detects the position pointed by the user in the screen appearing on display unit 206, based on the position detected by touch panel 207B. CPU 201 accepts input of a variety of instructions and data such as characters and numerals through the user's operation, based on the screen appearing on display unit 206 and the position detected by touch panel 207B. For example, when a screen including a ten-key image appears on display unit 206, the number corresponding to the key displayed at the position detected by touch panel 207B is accepted.

Camera 202 includes a lens and an optoelectronic transducer, and light collected by the lens is imaged on the optoelectronic transducer. The optoelectronic transducer transduces the received light and outputs image data to CPU 201. Examples of the optoelectronic transducer include a CMOS (Complementary Metal Oxide Semiconductor) sensor and a CCD (Charge Coupled Device) sensor. Camera 202 is arranged at a position where its image capturing range includes the user who views display unit 206. Specifically, camera 202 has its optical axis approximately parallel to the normal to the display surface of display unit 206 and is arranged such that the image capturing direction is coincident with the direction of the display surface. In other words, camera 202 includes the user's face in the image capturing range when the user views display unit 206.

Radio communication unit 204 communicates by radio with a mobile phone base station connected to a telephone communication network. Radio communication unit 204 connects portable information device 200 to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201 and connects portable information device 200 to an email server to transmit/receive an email.

Wireless LAN I/F 208 is an interface which communicates with radio station 5 to connect portable information device 200 to network 3. The respective IP (Internet Protocol) addresses of PC 300 and MFP 100 are registered in portable information device 200, so that portable information device 200 can communication with PC 300 and MFP 100 to transmit/receive data. In the present embodiment, portable information device 200 uses wireless LAN I/F 208 to communication with PC 300 and MFP 100, by way of example. However, any other communication scheme may be used to communicate with them. Specifically, in a case where portable information device 200, PC 300, and MFP 100 are installed with a near field communication device, for example, such as Bluetooth (R), portable information device 200 may perform one-to-one communication with PC 300 or MFP 100.

Flash memory 203 stores a program executed by CPU 201 or data necessary to execute the program. CPU 201 loads the program recorded in flash memory 203 into the RAM of CPU 201 for execution.

Position detection unit 209 detects the current position of portable information device 200. Specifically, position detection unit 209 is a GPS (Global Positioning System) receiver and receives radio waves from GPS satellites to measure the current position. Position detection unit 209 outputs a value indicating the measured current position, for example, the latitude and longitude to CPU 201.

Acceleration sensor 210 detects an acceleration of portable information device 200. Acceleration sensor 210 outputs the detected acceleration to CPU 201.

External storage device 211 is removable from portable information device 200. A CD-ROM 210A encoded with a remote operation program can be attached. CPU 201 can access CD-ROM 210A through external storage device 211. CPU 201 can load the remote operation program recorded on CD-ROM 210A attached to external storage device 211 into the RAM of CPU 201 for execution.

The program recorded in flash memory 203 or CD-ROM 210A has been described as a program executed by CPU 201. However, another computer connected to network 3 may overwrite the program stored in flash memory 203 or additionally write a new program. Portable information device 200 may download a program from another computer connected to network 3. The program referred to here includes not only a program directly executable by CPU 201 but also a source program, a compressed program, and an encrypted program.

The program executed by CPU 201 may be stored not only in CD-ROM 211A but also in other medium such as an optical disk (MO/MD/DVD), an IC card, an optical card, and a semiconductor memory such as a mask ROM, an EPROM, and an EEPROM.

Figure 5:
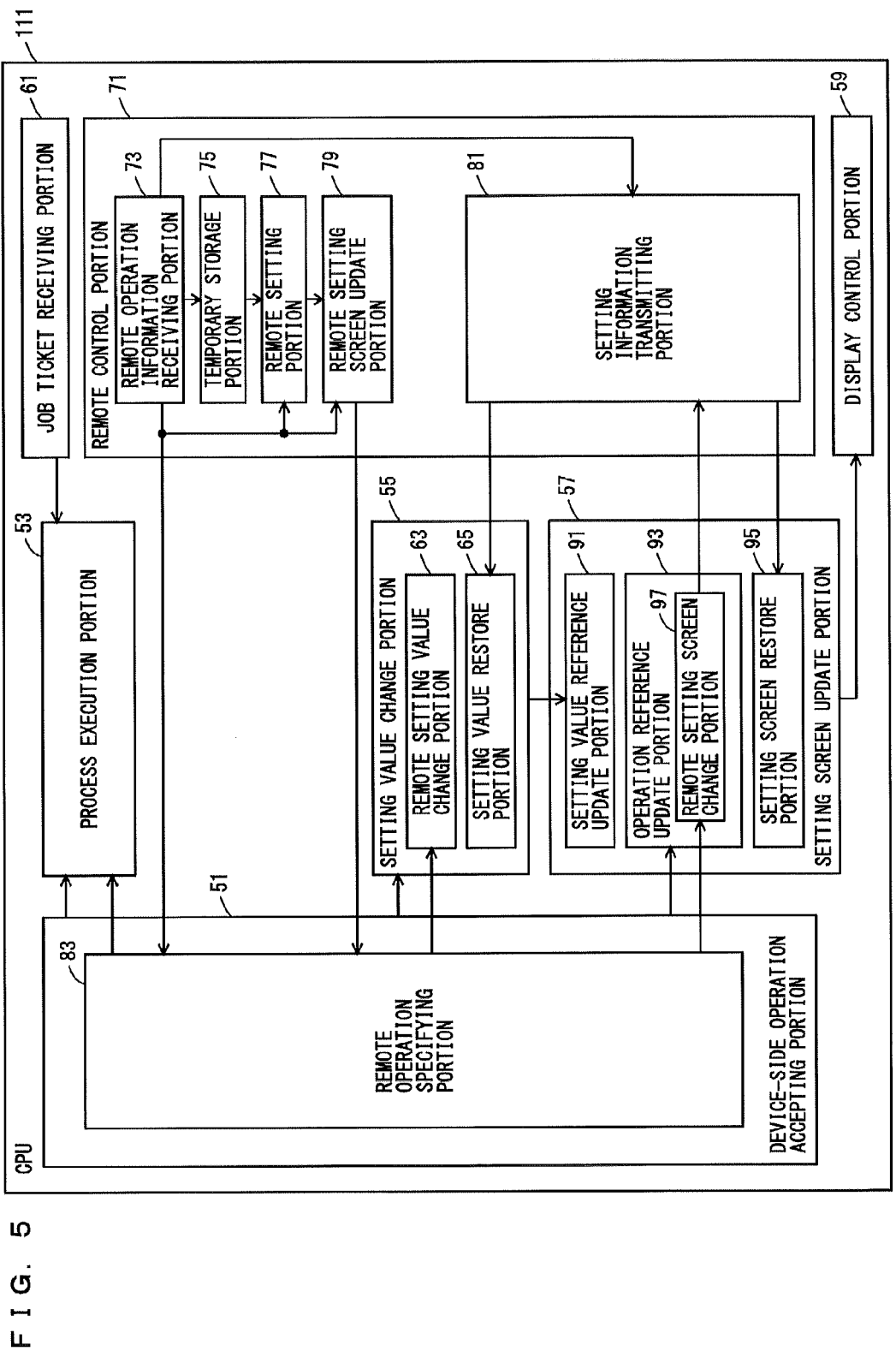
FIG. 5 is a block diagram showing an example of functions of the CPU of the MFP.

FIG. 5 is a block diagram showing an example of functions of the CPU of the MFP. The functions shown in FIG. 5 are formed in CPU 111 by CPU 111 of MFP 100 executing a remote control program stored in CD-ROM 113, HDD 115, or CD-ROM 118. Referring to FIG. 5, CPU 111 includes a device-side operation accepting portion 51 accepting the user's operation, a process execution portion 53 executing a process, a setting value change portion 55 changing a setting value, a setting screen update portion 57 updating a setting screen, a display control portion 59 controlling display unit 161, a job ticket receiving portion 61, and a remote control portion 71.

Device-side operation accepting portion 51 accepts an operation input to MFP 100 by the user. When the user operates operation panel 160, device-side operation accepting portion 51 accepts the operation input to operation panel 160 by the user.

When touch panel 165 detects a position in a display surface of display unit 161, device-side operation accepting portion 51 specifies a position in a setting screen appearing on display unit 161. The setting screen includes a plurality of buttons which are associated with respective operations in advance. Device-side operation accepting portion 51 specifies the button corresponding to the specified position in the setting screen and specifies the operation associated with the specified button. The operations associated with the setting screen include a setting operation for setting a setting value, a screen transition operation for changing a setting screen, and an execution instruction operation for giving an instruction to execute a process.

When accepting a setting operation, device-side operation accepting portion 51 outputs the setting operation to setting value change portion 55. When accepting a screen transition operation, device-side operation accepting portion 51 outputs the screen transition operation to setting screen update portion 57. When accepting an execution instruction operation, device-side operation accepting portion 51 outputs an execution command to process execution portion 53 to give an instruction to execute a process specified by the execution instruction operation.

In response to a setting operation being input from device-side operation accepting portion 51, setting value change portion 55 changes the setting value stored in the setting value storage area in RAM 114 in accordance with the setting operation. When the setting value stored in the setting value storage area in RAM 114 is changed, setting value change portion 55 outputs a change signal to setting screen update portion 57 to indicate the setting value has been changed.

Setting screen update portion 57 receives a change signal from setting value change portion 55 and receives a screen transition operation from device-side operation accepting portion 51. In response to a change signal or a screen transition operation being input, setting screen update portion 57 updates the setting screen stored in the setting screen storage area in RAM 114 and outputs a screen update signal to display control portion 59 and remote control portion 71 to indicate that the setting screen has been updated.

Setting screen update portion 57 includes a setting value reference update portion 91 and an operation reference update portion 93. In response to a change signal being input from setting value change portion 55, setting value reference update portion 91 updates the setting screen stored in the setting screen storage area in RAM 114 based on the setting value stored in the setting value storage area in RAM 114, then stores the updated setting screen into the setting screen storage area in RAM 114, and outputs a screen update signal to display control portion 59 and remote control portion 71. In response to a screen transition operation being input from device-side operation accepting portion 51, operation reference update portion 93 generates a setting screen specified by the screen transition operation based on the setting value stored in the setting value storage area in RAM 114, then stores the generated setting screen into the setting screen storage area in RAM 114, and outputs a screen update signal to display control portion 59.

In response to a screen update signal being input from setting screen update portion 57, display control portion 59 displays the setting screen stored in the setting screen storage area in RAM 114 on display unit 161.

In response to an execution command being input from device-side operation accepting portion 51, process execution portion 53 executes a process specified by the execution command in accordance with the setting value stored in the setting value storage area in RAM 114.

The processes executed by process execution portion 53 include a scan process of controlling automatic document feeder 120 and document scanning unit 130 to scan a document image, an image forming process of controlling image forming unit 140, paper feed unit 150, and post-processing unit 155 to form an image on paper, a data management process of reading or writing data stored in HDD 115 or CD-ROM 118, a facsimile process of controlling facsimile unit 116 to transmit/receive facsimile data, and a data transmission/reception process of controlling communication I/F unit 112 to transmit/receive data. The processes executed by process execution portion 53 include a combination of two or more processes as listed above. Examples include a copy process which is a combination of a scan process and an image forming process, a scan-to-send process which is a combination of a scan process and a data transmission process for transmitting image data obtained by scanning a document image, and a scan-to-BOX process which is a combination of a scan process and a data management process for storing image data obtained by scanning a document image into HDD 115.

Remote control portion 71 includes a remote operation information receiving portion 73, a temporary storage portion 75, a remote setting portion 77, a remote setting screen update portion 79, and a setting information transmitting portion 81.

Setting information transmitting portion 81 transmits setting information to portable information device 200. The setting information includes the setting value stored in the setting value storage area in RAM 114, the setting screen stored in the setting screen storage area in RAM 114, and screen identification information for identifying the setting screen. Setting information transmitting portion 81 transmits the setting information to portable information device 200 at a point of time when communication I/F unit 112 establishes a communication path for communication with portable information device 200.

Remote operation information receiving portion 73 controls communication I/F unit 112 to receive remote operation information from portable information device 200. The remote operation information is information transmitted by portable information device 200 when the user uses portable information device 200 to remotely control MFP 100, and includes screen identification information for identifying a setting screen, a setting value, and positional information indicating a position in the setting screen identified by the screen identification information. In response to the remote operation information being received, remote operation information receiving portion 73 outputs the remote operation information to device-side operation accepting portion 51, remote setting portion 77, and remote setting screen update portion 79, outputs a temporary storage instruction to temporary storage portion 75, and outputs the device identification information for identifying the device that has transmitted the remote operation information, here, portable information device 200, to setting information transmitting portion 81. The device identification information is the network address assigned to portable information device 200. Here, the device identification information is an IP (Internet Protocol) address.

In response to a temporary storage instruction being input from remote operation information receiving portion 73, temporary storage portion 75 stores the setting value stored in the setting value storage area in RAM 114 and the setting screen stored in the setting screen storage area into a temporary storage area in RAM 114. When the setting value and the setting screen are stored into the temporary storage area in RAM 114, temporary storage portion 75 outputs a setting instruction to remote setting portion 77.

Remote setting portion 77 receives remote operation information from remote operation information receiving portion 73. In response to a setting instruction being input from temporary storage portion 75, remote setting portion 77 stores the setting value included in the remote operation information into the setting value storage area in RAM 114 and outputs an update instruction to remote setting screen update portion 79.

Remote setting screen update portion 79 receives remote operation information from remote operation information receiving portion 73. In response to an update instruction being input from remote setting portion 77, remote setting screen update portion 79 generates a setting screen specified by the screen identification information included in the remote operation information based on the setting value stored in the setting value storage area in RAM 114, stores the generated setting screen into the setting screen storage area in RAM 114, and outputs a specifying instruction to device-side operation accepting portion 51.

Device-side operation accepting portion 51 includes a remote operation specifying portion 83. Remote operation specifying portion 83 receives remote operation information from remote operation information receiving portion 73. In response to a specifying instruction being input from remote setting screen update portion 79, remote operation specifying portion 83 specifies a remote operation based on the positional information included in the remote operation information. At a point of time when the specifying instruction is input from remote setting screen update portion 79, the setting value included in the remote operation information has been stored in the setting value storage area in RAM 114, and the setting screen specified by the screen identification information included in the remote operation information has been stored in the setting screen storage area in RAM 114. Remote operation specifying portion 83 specifies a position in the setting screen stored in the setting screen storage area in RAM 114 with the positional information included in the remote operation information. The setting screen includes a plurality of buttons, each of which is associated with an operation in advance. Remote operation specifying portion 83 specifies a button corresponding to the specified position in the setting screen and specifies the operation associated with the specified button. The operations associated with the setting screen include a setting operation for setting a setting value, a screen transition operation for changing a setting screen, and an execution instruction operation for giving an instruction to execute a process.

When specifying a setting operation, remote operation specifying portion 83 outputs the setting operation to setting value change portion 55. When specifying a screen transition operation, remote operation specifying portion 83 outputs the screen transition operation to setting screen update portion 57. When specifying an execution instruction operation, remote operation specifying portion 83 outputs an execution command to process execution portion 53 to give an instruction to execute a process specified by the execution instruction operation.

Setting value change portion 55 includes a remote setting value change portion 63. In response to a setting operation being input from remote operation specifying portion 83, remote setting value change portion 63 changes the setting value stored in the setting value storage area in RAM 114 in accordance with the setting operation. When the setting value stored in the setting value storage area in RAM 114 is changed, remote setting value change portion 63 outputs a change signal to setting screen update portion 57 to indicate that the setting value has been changed.

In response to a change signal being input from remote setting value change portion 63, setting value reference update portion 91 included in setting screen update portion 57 updates the setting screen stored in the setting screen storage area in RAM 114 based on the setting value stored in the setting value storage area in RAM 114, stores the updated setting screen into the setting screen storage area in RAM 114, and outputs a screen update signal to display control portion 59 and remote control portion 71. Display control portion 59 then displays the setting screen stored in the setting screen storage area in RAM 114 on display unit 161.

Operation reference update portion 93 included in setting screen update portion 57 includes a remote setting screen change portion 97. In response to a screen transition operation being input from remote operation specifying portion 83, remote setting screen change portion 97 generates a setting screen specified by the screen transition operation based on the setting value stored in the setting value storage area in RAM 114, stores the generated setting screen into the setting screen storage area in RAM 114, outputs a change completion signal to setting information transmitting portion 81, and outputs a screen update signal to display control portion 59. Display control portion 59 then displays the setting screen stored in the setting screen storage area in RAM 114 on display unit 161.

In response to a change completion signal being input from remote setting screen change portion 97, setting information transmitting portion 81 transmits the setting information to portable information device 200 and outputs a restore instruction to setting value change portion 55 and setting screen update portion 57.

Setting value change portion 55 includes a setting value restore portion 65. In response to a restore instruction being input from setting information transmitting portion 81, setting value restore portion 65 stores the setting value stored in the temporary storage area in RAM 114 into the setting value storage area in RAM 114.

Setting screen update portion 57 includes a setting screen restore portion 95. In response to a restore instruction being input from setting information transmitting portion 81, setting screen restore portion 95 stores the setting screen stored in the temporary storage area in RAM 114 into the setting screen storage area in RAM 114.

Job ticket receiving portion 61 controls communication I/F unit 112 to receive a job ticket from portable information device 200. The job ticket includes data to be processed, a setting value, and an execution command. Job ticket receiving portion 61 receiving a job ticket outputs the job ticket to process execution portion 53.

In response to an execution command being input from remote operation specifying portion 83, process execution portion 53 executes a process specified by the execution command, in accordance with the setting value stored in the setting value storage area in RAM 114. When receiving a job ticket from job ticket receiving portion 61, process execution portion 53 executes a process specified by the execution command included in the job ticket on the data included in the job ticket, in accordance with the setting value included in the job ticket.

The setting screen transmitted to portable information device 200 may be a setting screen for remote operation that is different from the setting screen appearing on display unit 161. In this case, the setting screen for remote operation may be stored in the setting screen storage area in RAM 114, or the setting screen for remote operation may be stored in a remote setting screen storage area provided separately from the setting screen storage area in RAM 114.

In a case where a remote setting value storage area and a remote setting screen storage area are provided separately from the setting value storage area and the setting screen storage area in RAM 114, the setting screen stored in the setting screen storage area is not changed, and the display on display unit 161 is therefore not changed. In this case, remote setting screen update portion 79 stores the setting screen for remote operation specified by the screen identification information included in the remote operation information, into the remote setting screen storage area in RAM 114. In a case where the setting value stored in the remote setting value storage area in RAM 114 is changed by remote setting value change portion 63, in response to a change signal being input from remote setting value change portion 63, setting value reference update portion 91 updates the setting screen stored in the remote setting screen storage area in RAM 114 based on the setting value stored in the remote setting value storage area in RAM 114 and stores the updated setting screen into the remote setting screen storage area in RAM 114. In response to a screen transition operation being input from remote operation specifying portion 83, remote setting screen change portion 97 generates a setting screen for remote operation specified by the screen transition operation based on the setting value stored in the remote setting value storage area in RAM 114 and stores the generated setting screen for remote operation into the remote setting screen storage area in RAM 114.

Figure 6:
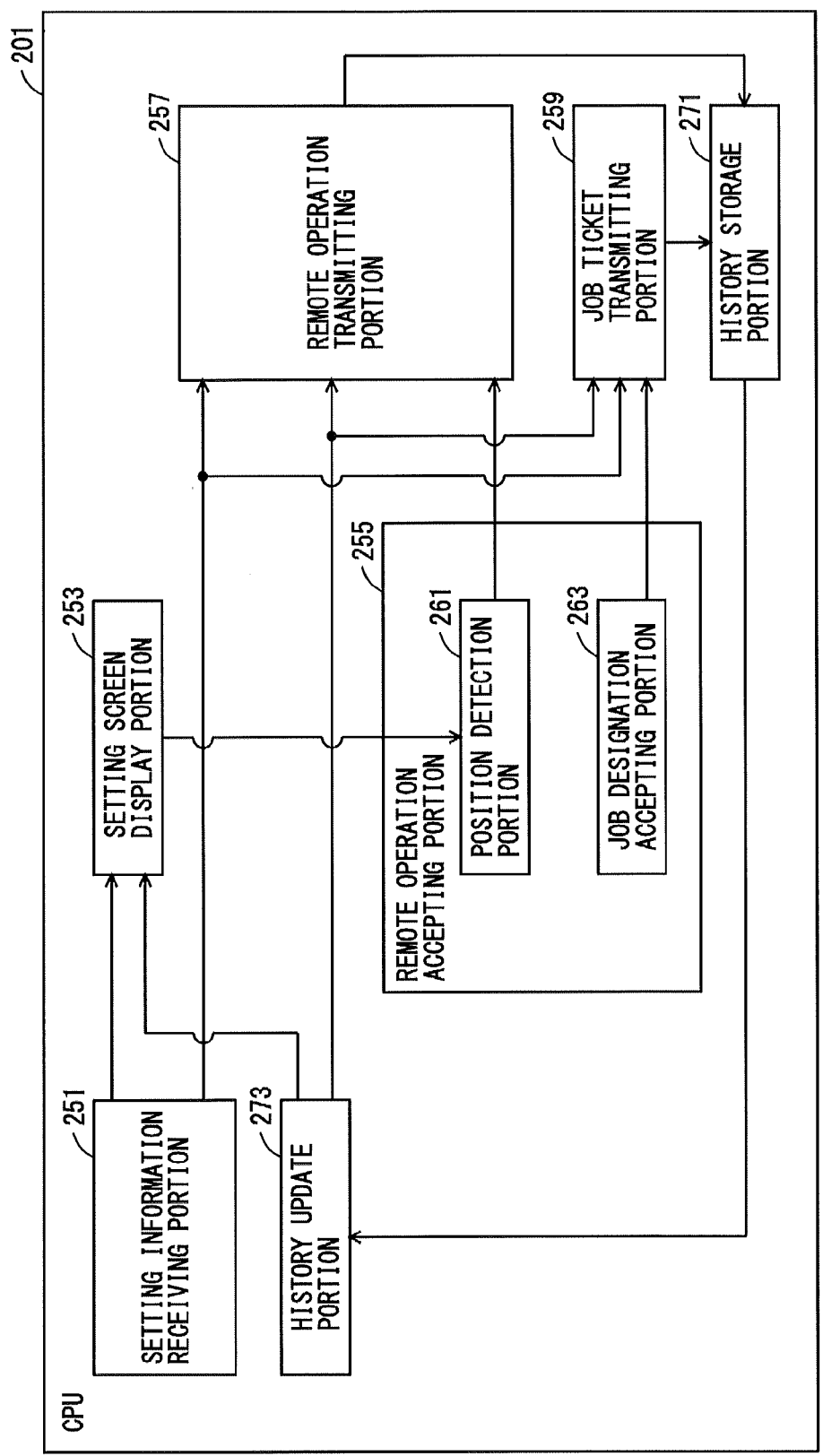
FIG. 6 is a block diagram showing an example of overall functions of the CPU of the portable information device in the present embodiment.

FIG. 6 is a block diagram showing an example of overall functions of the CPU of the portable information device in the present embodiment. The functions shown in FIG. 6 are formed in CPU 201 by CPU 201 of portable information device 200 executing a remote operation program stored in flash memory 203 or CD-ROM 211A. Referring to FIG. 6, CPU 201 includes a setting information receiving portion 251, a setting screen display portion 253, a remote operation accepting portion 255 accepting the user's operation, a remote operation transmitting portion 257, a job ticket transmitting portion 259 transmitting a job ticket, a history storage portion 271, and a history update portion 273.

Setting information receiving portion 251 controls wireless LAN I/F 208 to receive setting information from MFP 100. The user operates operation unit 207 to input an instruction to remotely operate MFP 100, so that setting information receiving portion 251 controls wireless LAN I/F 208 to transmit a connection request to MFP 100 to establish a communication path with MFP 100. When a communication path is established with MFP 100, setting information receiving portion 251 outputs a session number for identifying the communication path to history update portion 273.

Setting information receiving portion 251 controls wireless LAN I/F 208 to receive setting information through the communication path established with MFP 100. The setting information includes the setting value set in MFP 100, the setting screen appearing on MFP 100, and the screen identification information for identifying the setting screen. Setting information receiving portion 251 outputs the setting screen included in the setting information received from MFP 100 to setting screen display portion 253, outputs the setting value and the screen identification information included in the setting information to remote operation transmitting portion 257, and outputs the setting information to job ticket transmitting portion 259.

In response to a setting screen being input from setting information receiving portion 251, setting screen display portion 253 displays the setting screen on display unit 206 and outputs the setting screen to remote operation accepting portion 255.

Remote operation accepting portion 255 accepts an operation input to operation unit 207 by the user. Remote operation accepting portion 255 includes a position detection portion 261 detecting a position in the setting screen and a job designation accepting portion 263 accepting designation of a job. When touch panel 207B detects a position in the display surface of display unit 206, position detection portion 261 specifies the position in the setting screen input from setting screen display portion 253, based on the position detected by touch panel 207B. Position detection portion 261 outputs positional information to remote operation transmitting portion 257 to indicate the specified position in the setting screen. In a case where an enlarged or reduced setting screen appears on display unit 206, position detection portion 261 detects the position in the setting screen, based on the position detected by touch panel 207B. In a case where a rotated setting screen appears on display unit 206, position detection portion 261 detects the position in the setting screen, based on the position detected by touch panel 207B. For example, the position may be detected as a coordinate in a coordinate system having the origin at the upper left of the setting screen.

Job designation accepting portion 263 accepts designation of data to be processed and designation of a process to be executed by MFP 100. The data to be processed includes data stored in flash memory 203 or CD-ROM 211A and data downloaded from a computer connected to the Internet. For example, in a case where an application program such as a data management program or a browsing program is executed and the user designates the data specified by the application program as data to be processed, job designation accepting portion 263 accepts the designated data as data to be processed. Job designation accepting portion 263 outputs the designated data to job ticket transmitting portion 259.

Remote operation transmitting portion 257 receives a setting value and screen identification information from setting information receiving portion 251 and receives positional information from position detection portion 261. In response to positional information being input from position detection portion 261, remote operation transmitting portion 257 transmits remote operation information including the positional information and the setting value and screen identification information input from setting information receiving portion 251 to MFP 100 through wireless LAN I/F 208. In response to transmission of the remote operation information, remote operation transmitting portion 257 outputs history information including the setting value, the setting screen, and the screen identification information to history storage portion 271.

Job ticket transmitting portion 259 receives setting information from setting information receiving portion 251 and data from job designation accepting portion 263. In response to data being input from job designation accepting portion 263, job ticket transmitting portion 259 generates a job ticket including the data, the setting value included in the setting information input from setting information receiving portion 251, and an execution command and transmits the generated job ticket to MFP 100 through wireless LAN I/F 208. The execution command is a command to allow MFP 100 to execute a predetermined process for the setting screen corresponding to the screen identification information. The execution command specifies a process to be executed by MFP 100. In response to transmission of the job ticket, job ticket transmitting portion 259 outputs history information including the setting value, the setting screen, and the screen identification information to history storage portion 271.

In response to history information being input from remote operation transmitting portion 257 or job ticket transmitting portion 259, history storage portion 271 stores the history information into flash memory 203.

History update portion 273 selects one of pieces of history information stored into flash memory 203 by history storage portion 271. The user operates operation unit 207 to input an operation of selecting one of one or more pieces of history information stored in flash memory 203, whereby the selected history information is selected. History update portion 273 reads out the selected history information from flash memory 203, then outputs the setting screen included in the read history information to setting screen display portion 253, outputs the screen identification information and the setting value included in the history information to remote operation transmitting portion 257, and outputs the setting value, the setting screen, and the screen identification information included in the history information to job ticket transmitting portion 259. History update portion 273 further transmits the history information read from flash memory 203 to MFP 100 through wireless LAN I/F 208.

In response to a setting screen being input from history update portion 273, setting screen display portion 253 displays the setting screen on display unit 206 and outputs the setting screen to remote operation accepting portion 255.

When a setting value and screen identification information are input from history update portion 273, in response to positional information being input from position detection portion 261, remote operation transmitting portion 257 transmits remote operation information including the positional information and the setting value and screen identification information input from history update portion 273, to MFP 100 through wireless LAN I/F 208. In response to transmission of the remote operation information, remote operation transmitting portion 257 outputs history information including the setting value, the setting screen, and the screen identification information to history storage portion 271.

When a setting value, a setting screen, and screen identification information are input from history update portion 273, in response to data being input from job designation accepting portion 263, job ticket transmitting portion 259 generates a job ticket including the data, the setting value input from history update portion 273, and an execution command and transmits the generated job ticket to MFP 100 through wireless LAN I/F 208. In response to transmission of the job ticket, job ticket transmitting portion 259 outputs history information including the setting value, the setting screen, and the screen identification information to history storage portion 271.

The user can use the same setting value as the one set by the remote operation at a point of time when the user remotely operate MFP 100 in the past, and therefore does not have to perform a remote operation for setting a setting value.

Figure 7:
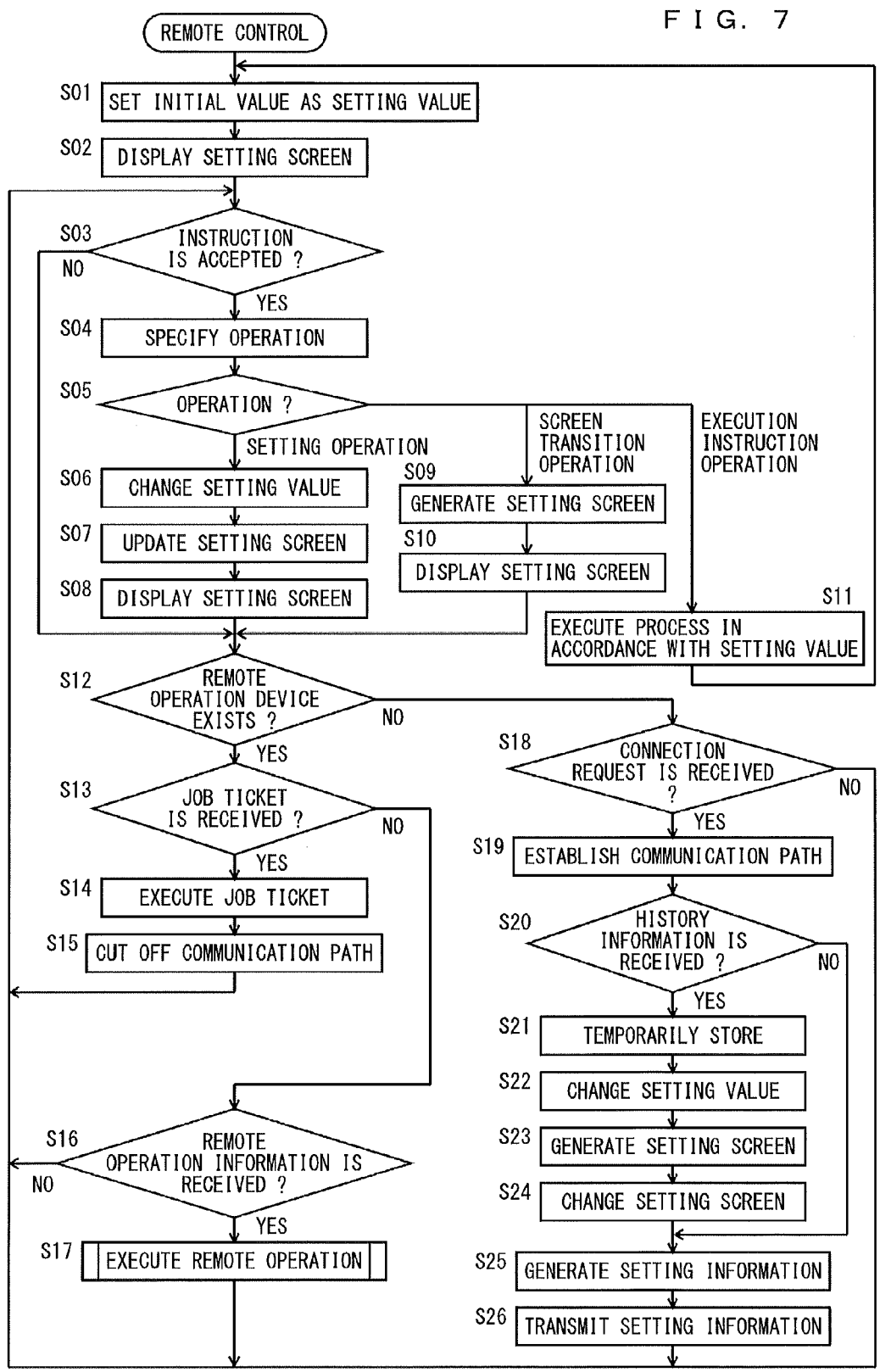
FIG. 7 is a flowchart showing an example of the procedure of a remote control process.

FIG. 7 is a flowchart showing an example of the procedure of a remote control process. The remote control process is a process executed by CPU 111 when CPU 111 of MFP 100 executes the remote control program stored in ROM 113, HDD 115, or CD-ROM 118.

Referring to FIG. 7, CPU 111 sets an initial value as a setting value (step S01). The setting value predetermined as an initial value in the setting value storage area in RAM 114 is stored. In the next step S02, the setting screen is displayed on display unit 161. The setting screen here is a predetermined setting screen. Specifically, a setting screen is stored into the setting screen storage area in RAM 114. In a case where a setting screen includes a setting value, a setting screen including a setting value stored in the setting value storage area in RAM 114 is generated, and the generated setting screen is stored into the setting screen storage area in RAM 114.

In step S03, it is determined whether an instruction is accepted. If the user points on touch panel 165, it is determined that an instruction is accepted. In the next step S04, an operation is specified. An operation is specified based on the position in the setting screen specified by the instruction accepted in step S03. In step S05, the process branches depending on the specified operation. If the specified operation is a setting operation, the process proceeds to step S06. If the specified operation is a screen transition operation, the process proceeds to step S09. If the specified operation is an execution instruction operation, the process proceeds to step S11.

In step S06, the setting value is changed, and the process proceeds to step S07. The setting value stored in the setting value storage area in RAM 114 is changed in accordance with the setting operation. In the next step S07, the setting screen is updated. The same setting screen as the one stored in the setting screen storage area in RAM 114 is generated in accordance with the setting value stored in the setting value storage area in RAM 114, and the setting screen stored in the setting screen storage area in RAM 114 is updated with the generated setting screen. In the next step S08, the setting screen stored in the setting screen storage area in RAM 114 is displayed on display unit 161. The process then proceeds to step S12. The setting screen that reflects the setting value changed in step S06 thus appears on display unit 161.

In step S09, the setting screen specified by the screen transition operation is generated in accordance with the setting value stored in the setting value storage area in RAM 114, and the setting screen stored in the setting screen storage area in RAM 114 is updated with the generated setting screen. In the next step S10, the setting screen stored in the setting screen storage area in RAM 114 is displayed on display unit 161. The process then proceeds to step S12.

In step S11, the process specified by the execution instruction operation is executed in accordance with the setting value stored in the setting value storage area in RAM 114. The process then returns to step S01.

In step S12, it is determined whether there exists a remote operation device. The remote operation device is a device that remotely controls MFP 100 and with which a communication path has been established. The communication path with the remote operation device is established in step S19 described later. If a remote operation device with which a communication path has been established exists, the process proceeds to step S13. If there exists none, the process proceeds to step S18.

In step S18, it is determined whether a connection request has been received. It is determined whether communication I/F unit 112 has received a connection request from the outside. If a connection request has been received, the process proceeds to step S19. If not, the process returns to step S03. Here, a connection request has been received from portable information device 200, by way of example.

In step S19, a communication path is established with portable information device 200. It is then determined whether history information has been received (step S20). If history information has been received through the communication path established in step S19, the process proceeds to step S21. If not, the process proceeds to step S25. In step S21, the setting value and the setting screen are temporarily stored. The setting value stored in the setting value storage area in RAM 114 and the screen identification information of the setting screen stored in the setting screen storage area in RAM 114 are temporarily stored into the temporary storage area in RAM 114. This is to return to the state before the remote operation process is performed, after the remote operation process based on remote operation is performed.

In step S22, the setting value is changed. The setting value stored in the setting value storage area in RAM 114 is changed to the setting value included in the remote operation information received from portable information device 200. Next, a setting screen is generated (step S23). A setting screen specified by the screen identification information included in the history information received from portable information device 200 is generated in accordance with the setting value stored in the setting value storage area in RAM 114. The setting screen is then changed (step S24). The setting screen stored in the setting screen storage area in RAM 114 is updated with the setting screen generated in step S23.

In step S25, setting information is generated. The setting information includes the setting value stored in the setting value storage area in RAM 114, the setting screen stored in the setting screen storage area in RAM 114, and the screen identification information for identifying the setting screen. In the next step S26, the setting information is transmitted to portable information device 200 as a remote operation device through the communication path established in step S19. The process then returns to step S03.

When the process proceeds to step S13, a remote operation device exists. Here, a communication path has been established with portable information device 200 in step S19. In step S13, it is determined whether a job ticket has been received from portable information device 200 as a remote operation device. If communication I/F unit 112 receives a job ticket from portable information device 200, the process proceeds to step S14. If not, the process proceeds to step S16. The job ticket includes data to be processed, a setting value, and an execution command. In step S14, the job ticket is executed. The process proceeds to step S15. A process specified by the execution command included in the job ticket is executed on the data to be processed that is included in the job ticket, in accordance with the setting value included in the job ticket.

For example, if the process specified by the execution command included in the job ticket is an image forming process, paper feed unit 150, image forming unit 140, and post-processing unit 155 are controlled such that an image of the data to be processed that is included in the job ticket is formed on paper in accordance with the setting value included in the job ticket. If the process specified by the execution command included in the job ticket is a data management process, HDD 115 or external storage device 117 is controlled such that an image of the data to be processed that is included in the job ticket is stored into HDD 116 or CD-ROM 118 in accordance with the setting value included in the job ticket. If the process specified by the execution command included in the job ticket is a facsimile process, facsimile unit 116 is controlled such that the data to be processed that is included in the job ticket is converted into facsimile data, which is in turn transmitted to a destination specified by the setting value included in the job ticket. If the process specified by the execution command included in the job ticket is a data transmission process, communication I/F unit 112 is controlled such that the data to be processed that is included in the job ticket is transmitted to a destination specified by the setting value included in the job ticket.

In step S15, the communication path established in step S19 is cut off. The process returns to step S03.

In step S16, it is determined whether remote operation information has been received. If communication I/F unit 112 receives remote operation information from portable information device 200 as a remote operation device, the process proceeds to step S17. If not, the process returns to step S03. The remote operation information includes screen identification information for identifying a setting screen, a setting value, and positional information indicating a position in the setting screen identified by the screen identification information. In step S17, a remote operation execution process is performed. The process then returns to step S03.

Figure 8:
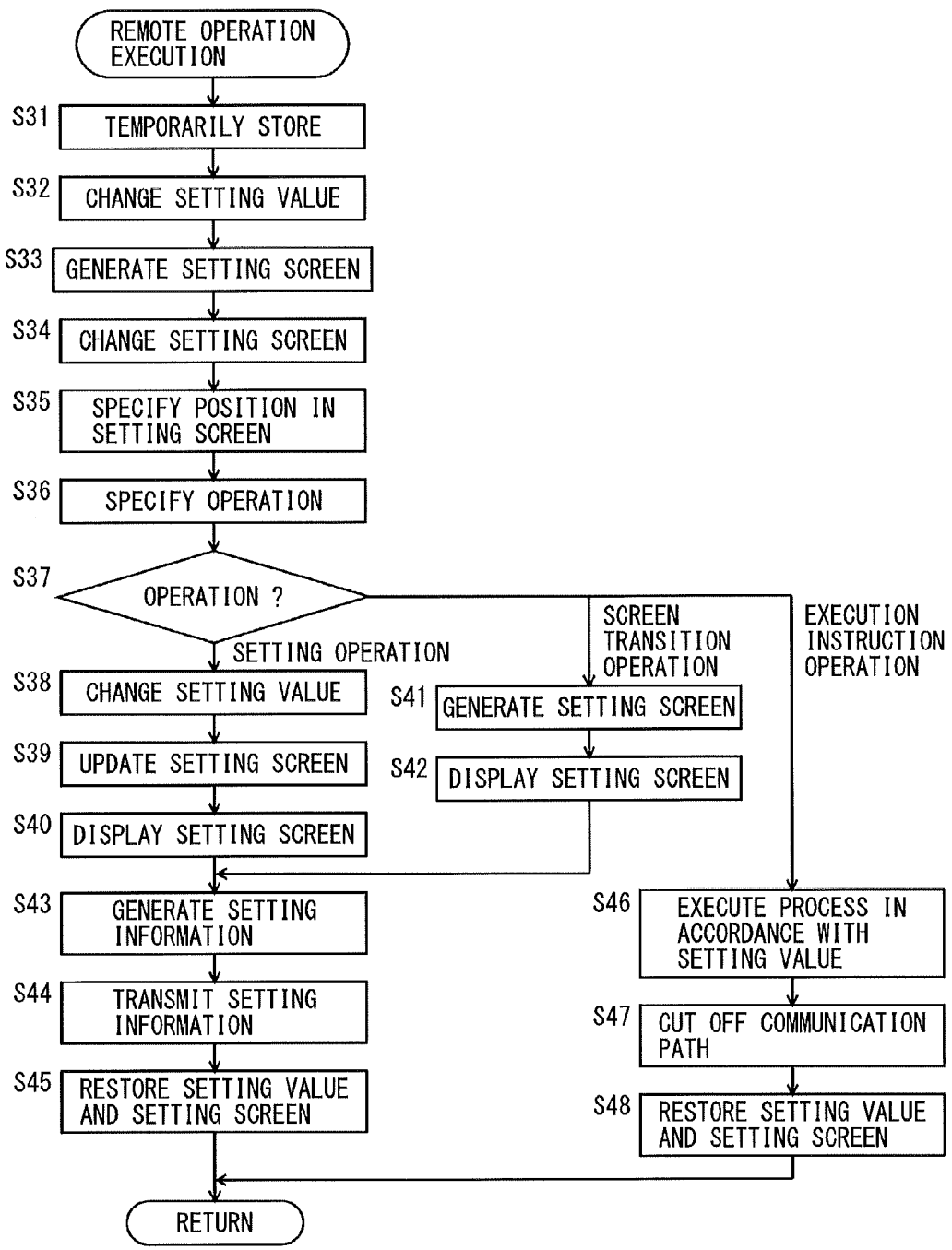
FIG. 8 is a flowchart showing an example of the procedure of a remote operation execution process.

FIG. 8 is a flowchart showing an example of the procedure of a remote operation execution process. The remote operation execution process is a process performed in step S17 in FIG. 7. Before step S17 is performed, the remote operation information has been received from portable information device 200 as a remote operation device. The remote operation execution process is a process of executing a process in accordance with the remote operation information.

Referring to FIG. 8, CPU 111 temporarily stores the setting value and the setting screen (step S31). The setting value stored in the setting value storage area in RAM 114 and the screen identification information of the setting screen stored in the setting screen storage area in RAM 114 are temporarily stored into the temporary storage area in RAM 114. This is to return to the state before the remote operation process is performed, after the remote operation process based on remote operation is performed.

In step S32, the setting value is changed. The setting value stored in the setting value storage area in RAM 114 is changed to the setting value included in the remote operation information received from portable information device 200. Next, a setting screen is generated (step S33). A setting screen specified by the screen identification information included in the remote operation information received from portable information device 200 is generated in accordance with the setting value stored in the setting value storage area in RAM 114. The setting screen is then changed (step S34). The setting screen stored in the setting screen storage area in RAM 114 is updated with the setting screen generated in step S33.

In the next step S35, the position in the setting screen is specified. The position in the setting screen is specified based on the positional information included in the remote operation information received from portable information device 200 and the setting screen stored in the setting screen storage area in RAM 114. The operation is specified based on the specified position (step S36). The setting screen stored in the setting screen storage area in RAM 114 has an area (button) associated with an operation, and the operation associated with the area including the position in the setting screen is specified.

In the next step S37, the process branches depending on the specified operation. If the specified operation is a setting operation, the process proceeds to step S38. If the specified operation is a screen transition operation, the process proceeds to step S41. If the specified operation is an execution instruction operation, the process proceeds to step S46.

In step S38, the setting value is changed, and the process then proceeds to step S39. The setting value stored in the setting value storage area in RAM 114 is changed in accordance with the setting operation. In the next step S39, the setting screen is updated. The same setting screen as the one stored in the setting screen storage area in RAM 114 is generated in accordance with the setting value stored in the setting value storage area in RAM 114, and the setting screen stored in the setting screen storage area in RAM 114 is updated with the generated setting screen. In the next step S40, the setting screen stored in the setting screen storage area in RAM 114 is displayed on display unit 161. The process proceeds to step S43.

In step S41, a setting screen is generated. A setting screen specified by the screen transition operation is generated in accordance with the setting value stored in the setting value storage area in RAM 114, and the setting screen stored in the setting screen storage area in RAM 114 is updated with the generated setting screen. In the next step S42, the setting screen stored in the setting screen storage area in RAM 114 is displayed on display unit 161. The process proceeds to step S43.

In step S43, setting information is generated. Setting information is generated which includes the setting value stored in the setting value storage area in RAM 114, the setting screen stored in the setting screen storage area in RAM 114, and the screen identification information for identifying the setting screen. In the next step S44, the setting information is transmitted to portable information device 200 as a remote operation device. The process proceeds to step S45.

In step S45, the setting value and the setting screen are restored, and the process returns to the remote control process. In step S31, the setting value stored in the setting value storage area in RAM 114 is updated with the setting value stored in the temporary storage area in RAM 114. In addition, the setting screen specified by the screen identification information stored in the temporary storage area in RAM 114 is generated in accordance with the setting value stored in the setting value storage area in RAM 114, and the setting screen stored in the setting screen storage area in RAM 114 is updated with the generated setting screen.

In step S46, the process specified by the execution instruction operation is performed in accordance with the setting value stored in the setting value storage area in RAM 114. The process proceeds to step S47. In step S47, the communication path established with portable information device 200 as a remote operation device is cut off. The process proceeds to step S48. In step S48, the setting value and the setting screen are restored in the same manner as in step S45. The process then returns to the remote control process.

Figure 9:
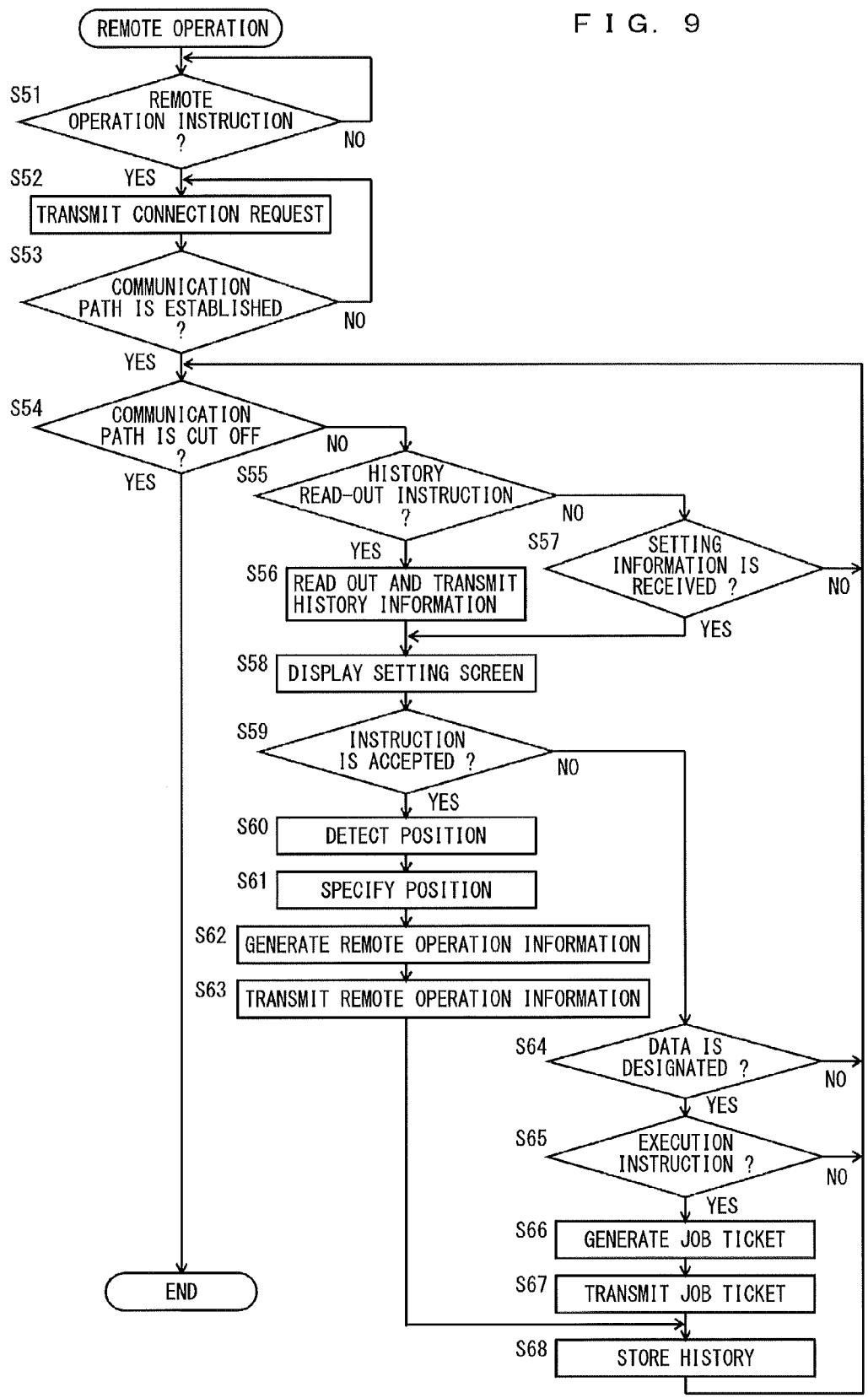
FIG. 9 is a flowchart showing an example of the procedure of a remote operation process.

FIG. 9 is a flowchart showing an example of the procedure of a remote operation process. The remote operation process is a process executed by CPU 201 by CPU 201 of portable information device 200 executing the remote operation program stored in flash memory 203 or CD-ROM 211A. Referring to FIG. 9, CPU 201 determines whether a remote operation instruction is accepted (step S51). A remote operation instruction is accepted if operation unit 207 accepts a remote operation instruction input by the user. The process waits until a remote operation instruction is accepted (NO in step S51). If a remote operation instruction is accepted (YES in step S51), the process proceeds to step S52.

In step S52, a connection request is transmitted to MFP 100. Wireless LAN I/F 208 is controlled to transmit a connection request to establish a communication path with MFP 100. It is then determined whether a connection path is established (step S53). A communication path is established by negotiating with MFP 100. Step S52 is repeated until a communication path is established (NO in step S53). If a communication path is established (YES in step S53), the process proceeds to step S54.

In step S54, it is determined whether the communication path established in step S53 is cut off by MFP 100. If the communication path is cut off, the process ends. If not, the process proceeds to step S55.

In step S55, it is determined whether a history read-out instruction is accepted. If an operation of selecting history information stored in flash memory 203 is accepted in step S68 described later, a history read-out instruction is accepted. If a history read-out instruction is accepted, the process proceeds to step S56. If not, the process proceeds to step S57.

In step S56, the history information selected in step S55 is read out from flash memory 203, and wireless LAN I/F 208 is controlled to transmit the history information to MFP 100. The process then proceeds to step S58. The history information includes a setting value, a setting screen, and screen identification information.

In step S57, it is determined whether setting information is received. Wireless LAN I/F 208 is controlled to receive setting information from MFP 100. If setting information is received, the process proceeds to step S58. If not, the process returns to step S54.

In the process from step S58 to step S68, in case where step S56 is performed, the setting information, setting screen, and screen identification information included in the history information read out from flash memory 203 in step S56 are used, and in a case where the determination is YES in step S57, the setting value, setting screen, and screen identification information included in the setting information received from MFP 100 are used.

In step S58, in a case where the process proceeds from step S57, the setting screen included in the setting information appears on display unit 206. In a case where the process proceeds from step S56, the setting screen included in the history information appears on display unit 206.

In the next step S59, it is determined whether an instruction is accepted. An instruction is accepted if touch panel 207B detects a position pointed by the user. If an instruction is accepted, the process proceeds to step S60. If not, the process proceeds to step S64. In step S60, the position pointed by the user is detected. The position pointed by the user in the display surface of display unit 206 is detected. In the next step S61, The position in the setting screen is specified based on the detected position. Since the setting screen has been displayed on display unit 206 in step S58, the position in the setting screen corresponding to the position detected in step S60 is specified. In a case where an enlarged or reduced setting screen appears or a rotated setting screen has been displayed, the position in the setting screen is specified based on the detected position in the display surface of display unit 206.

Remote operation information is then generated (step S62). In a case where the determination is YES in step S57, remote operation information is generated which includes the setting value and screen identification information included in the setting information received in step S57 and the positional information indicating the position in the setting screen specified in step S61. In a case where step S56 is performed, remote operation information is generated which includes the setting value and screen identification information included in the history information read out from flash memory 203 in step S56 and the positional information indicating the position in the setting screen that is specified in step S61. In the next step S63, the remote operation information is transmitted to MFP 100 through wireless LAN I/F 208. The process proceeds to step S68.

On the other hand, in step S64, it is determined whether an operation of designating data is accepted. If the user inputs an operation of designating data to operation unit 207, the operation of designating data is accepted by operation unit 207. If the operation of designating data is accepted, the process proceeds to step S65. If not, the process returns to step S54.

The data includes data to be processed by an application program executed by portable information device 200. For example, in a case where portable information device 200 executes a browsing program, the user can designate, as data, a Web page downloaded from an external server by the browsing program. In a case where portable information device 200 executes an application program for viewing data stored in flash memory 203, the user can designate the data stored in flash memory 203.

In step S65, it is determined whether an execution instruction is accepted. If the user inputs an execution instruction to operation unit 207, operation unit 207 accepts the execution instruction. For example, in addition to the setting screen, a button associated with an execution command is displayed on display unit 206, and an execution instruction is accepted when the user points on the button. Here, the displayed buttons are associated with an execution command for executing an image forming process, an execution command for executing a data management process, an execution command for executing a facsimile process, and an execution command for executing a data transmission process. If an execution instruction is accepted, the process proceeds to step S66. If not, the process returns to step S54.

In step S66, a job ticket is generated. In a case where the determination is YES in step S57, a job ticket is generated which includes the setting value included in the setting information received in step S57, the data designated in step S64, and the execution command specified by the execution instruction accepted in step S65. In a case where step S56 is performed, a job ticket is generated which includes the setting value included in the history information, the data designated in step S64, and the execution command specified by the execution instruction accepted in step S65.

In the next step S67, the job ticket generated in step S66 is transmitted to MFP 100 through wireless LAN I/F 208. The process then proceeds to step S68.

In step S68, history information is stored, and the process returns to step S54. In a case where the process proceeds from step S63, history information which includes the setting value, setting screen, and screen identification information included in the remote operation information is generated and stored into flash memory 203. In the case where the process proceeds from step S67, history information which includes the setting value included in the job ticket, the setting screen appearing on display unit 206 at a point of time when step S67 is performed, and the screen identification information thereof is generated and stored into flash memory 203. The setting screen appearing on display unit 206 at a point of time when step S67 is performed is, in the case where the determination is YES in step S57, the setting screen included in the setting information received in step S57, and, in the case where step S56 is performed, the setting screen included in the history information read out from flash memory 203 in step S56.

FIG. 10 is a diagram showing an example of the time flow of information exchanged between the portable information device and the MFP in print system 1 in the present embodiment. FIG. 10 shows an example in which portable information device 200 and portable information device 200A remotely control MFP 100 at the same time. FIG. 10 shows the time flow from above to below in the vertical direction. The arrows in the figure show that data transmitted from the device at the bottom end of the arrow is received by the device at the point end of the arrow.

First, portable information device 200 transmits a connection request to MFP 100 (F01). A communication path is thus established between MFP 100 and portable information device 200. If the user selects history information at portable information device 200, portable information device 200 transmits history information to MFP 100 (F02). At MFP 100 receiving the history information, the setting value storage area and the setting screen storage area in RAM 114 are updated with the setting value and the setting screen included in the history information. If the user does not select history information, portable information device 200 does not transmit history information to MFP 100.

If history information is received after a communication path is established with portable information device 200, MFP 100 transmits to portable information device 200 setting information A1 including the setting value and setting screen updated based on the history information and the screen identification information of the setting screen. If history information is not received, MFP 100 transmits to portable information device 200 setting information A1 including the setting value and the setting screen stored in the setting value storage area and the setting screen storage area in RAM 114 at that point of time and the screen identification information of the setting screen (F03). Portable information device 200 receiving the setting information displays the setting screen included in the setting information A1 on display unit 206. In a period from F01 to F03, MFP 100 is remotely operated by portable information device 200.

Next, portable information device 200A transmits a connection request to MFP 100 (G01). A communication path is thus established between MFP 100 and portable information device 200A. If the user selects history information at portable information device 200A, portable information device 200A transmits the history information to MFP 100 (G02). At MFP 100 receiving the history information, the setting value storage area and the setting screen storage area in RAM 114 are updated with the setting value and the setting screen included in the history information. If the user does not select history information, portable information device 200A does not transmit history information to MFP 100.

If history information is received after a communication path is established with portable information device 200A, MFP 100 transmits to portable information device 200A setting information B1 including the setting value and setting screen updated based on the history information and the screen identification information of the setting screen. If history information is not received, MFP 100 transmits to portable information device 200A setting information B1 including the setting value and the setting screen stored in the setting value storage area and the setting screen storage area in RAM 114 at that point of time and the screen identification information of the setting screen (G03). Portable information device 200A receiving setting information B1 displays the setting screen included in the setting information B1 on display unit 206. In a period from G01 to G03, MFP 100 is remotely operated by portable information device 200A.

Next, at portable information device 200, if the user points on the setting screen appearing on display unit 206, the position pointed by the user in the setting screen is detected. Portable information device 200 transmits to MFP 100 remote operation information A1 including the positional information indicating the position pointed by the user and the setting value and the screen identification information included in the setting information A1 received from MFP 100 at F03 (F04). In response to reception of remote operation information A1, MFP 100 updates the setting value storage area in RAM 114 with the setting value included in remote operation information A1, generates the setting screen specified by the screen identification information included in remote operation information A1 based on the setting value stored in the setting value storage area, and stores the generated setting screen into the screen storage area in RAM 114. In addition, MFP 100 specifies the operation based on the setting screen stored in the setting screen storage area in RAM 114 and the positional information included in remote operation information A1 and performs the process corresponding to the operation, thereby updating the setting value stored in the setting value storage area in RAM 114 or the setting screen stored in the setting screen storage area. MFP 100 then transmits to portable information device 200 setting information A2 including the setting value and the setting screen stored in the setting value storage area and the setting screen storage area in RAM 114 and the screen identification information of the setting screen (F05). Portable information device 200 receiving setting information A2 displays the setting screen included in setting information A2 on display unit 206. In a period from F04 to F05, MFP 100 is remotely operated by portable information device 200.

Next, at portable information device 200A, if the user points on the setting screen appearing on display unit 206, the position pointed by the user in the setting screen is detected. Portable information device 200A transmits to MFP 100 remote operation information B1 including the positional information indicating the position pointed by the user and the setting value and screen identification information included in setting information B1 received from MFP 100 at G03 (G04). In response to reception of remote operation information B1, MFP 100 updates the setting value storage area in RAM 114 with the setting value included in remote operation information B1, generates the setting screen specified by the screen identification information included in remote operation information B1 based on the setting value stored in the setting value storage area, and stores the generated setting screen into the screen storage area in RAM 114. In addition, MFP 100 specifies the operation based on the setting screen stored in the setting screen storage area in RAM 114 and the positional information included in remote operation information B1 and performs the process corresponding to the operation, thereby updating the setting value stored in the setting value storage area in RAM 114 or the setting screen stored in the setting screen storage area. MFP 100 then transmits to portable information device 200A setting information B2 including the setting value and the setting screen stored in the setting value storage area and the setting screen storage area in RAM 114 and the screen identification information of the setting screen (G05). Portable information device 200A receiving setting information B2 displays the setting screen included in setting information B2 on display unit 206. In a period from G04 to G05, MFP 100 is remotely operated by portable information device 200A.

Next, at portable information device 200A, if the user points on the setting screen appearing on display unit 206, the position pointed by the user in the setting screen is detected. Portable information device 200A transmits to MFP 100 remote operation information B2 including the positional information indicating the position pointed by the user and the setting value and screen identification information included in setting information B2 received from MFP 100 at G05 (G06). In response to reception of remote operation information B2, MFP 100 updates the setting value storage area in RAM 114 with the setting value included in remote operation information B2, generates the setting screen specified by the screen identification information included in remote operation information B2 based on the setting value stored in the setting value storage area, and stores the generated setting screen into the screen storage area in RAM 114. In addition, MFP 100 specifies the operation based on the setting screen stored in the setting screen storage area in RAM 114 and the positional information included in remote operation information B2 and performs the process corresponding to the operation, thereby updating the setting value stored in the setting value storage area in RAM 114 or the setting screen stored in the setting screen storage area. MFP 100 transmits to portable information device 200A setting information B3 including the setting value and the setting screen stored in the setting value storage area and the setting screen storage area in RAM 114 and the screen identification information of the setting screen (G07). In a period from G06 to G07, MFP 100 is remotely operated by portable information device 200A.

Next, at portable information device 200, if the user points on the setting screen appearing on display unit 206, the position pointed by the user in the setting screen is detected. Portable information device 200 transmits to MFP 100 remote operation information A2 including the positional information indicating the position pointed by the user and the setting value and screen identification information included in setting information A2 received from MFP 100 at F05 (F06). In response to reception of remote operation information A2, MFP 100 updates the setting value storage area in RAM 114 with the setting value included in remote operation information A2, generates the setting screen specified by the screen identification information included in remote operation information A2 with the setting value stored in the setting value storage area, and stores the generated setting screen into the screen storage area in RAM 114. In addition, MFP 100 specifies the operation based on the setting screen stored in the setting screen storage area in RAM 114 and the positional information included in remote operation information A2 and performs the process corresponding to the operation, thereby updating the setting value stored in the setting value storage area in RAM 114 or the setting screen stored in the setting screen storage area. MFP 100 then transmits to portable information device 200 setting information A3 including the setting value and the setting screen stored in the setting value storage area and the setting screen storage area in RAM 114 and the screen identification information of the setting screen (F07). In a period from F06 to G07, MFP 100 is remotely operated by portable information device 200.

Next, at portable information device 200A, if the user designates data and inputs an execution instruction, job ticket B3 including the designated data, the setting value stored in the setting value storage area in RAM 114, and the execution command specified by the execution instruction is transmitted to MFP 100 (G08). At MFP 100 receiving the job ticket, a process (job B) corresponding to the execution command included in the job ticket is executed on the data included in the job ticket in accordance with the setting value included in the job ticket.

Next, at portable information device 200, if the user points on the setting screen appearing on display unit 206, the position pointed by the user in the setting screen is detected. Portable information device 200 transmits to MFP 100 remote operation information A3 including the positional information indicating the position pointed by the user and the setting value and screen identification information included in setting information A3 received from MFP 100 at F07 (F08). In response to reception of remote operation information A3, MFP 100 updates the setting value storage area in RAM 114 with the setting value included in remote operation information A3, generates the setting screen specified by the screen identification information included in remote operation information A3 based on the setting value stored in the setting value storage area, and stores the generated setting screen into the screen storage area in RAM 114. In addition, MFP 100 specifies the operation based on the setting screen stored in the setting screen storage area in RAM 114 and the positional information included in remote operation information A3. Here, an execution instruction operation is specified. In this case, MFP. 100 executes a process (job A) associated with the setting screen in accordance with the setting value stored in the setting value storage area in RAM 114.

As described above, in a case where MFP 100 is remotely controlled by portable information device 200 and portable information device 200A, a single setting value storage area and a single setting screen storage area in RAM 114 will suffice, and the storage area for storing setting values and setting screens does not increase.

As described above, in print system 1 in the present embodiment, MFP 100 functions as an image forming apparatus. MFP 100 transmits setting information including the setting value and the setting screen stored in the setting value storage area and the setting screen storage area in RAM 114 and the screen identification information of the setting screen to a remote operation device. Subsequently, in response to reception of remote operation information including a setting value, screen identification information, and positional information indicating a position in the setting screen specified by the screen identification information from the remote operation device, MFP 100 updates the setting value stored in the setting value storage area with the setting value included in the remote operation information. After the setting value is updated, MFP 100 generates a setting screen specified by the screen identification information included in the remote operation information, based on the setting value stored in the setting value storage area, updates the setting screen stored in the setting screen storage area with the generated setting screen, and specifies the remote operation based on the position specified by the positional information included in the remote operation information in the updated setting screen. Accordingly, in a case where a plurality of portable information devices 200, 200A, 200B exist as remote operation devices, a remote operation can be specified every time remote operation information is received from any one of a plurality of portable information devices 200, 200A, 200B. It is only necessary to provide a single setting value storage area for storing setting values and a single setting screen storage area for storing setting screens in RAM 114, so that the storage capacity of RAM 114 does not increase with increase in number of portable information devices 200, 200A, 200B.

MFP 100 can specify the operation based on the remote operation information received from portable information device 200, as the same operation as the operation input to operation unit 163 by the user. As a result, the process corresponding to the operation specified based on the remote operation information received from any one of portable information devices 200, 200A, 200B can be equated with the process corresponding to the same operation as the operation input to operation unit 163 by the user. This eliminates the need for newly developing components that execute the process corresponding to the operation specified based on the remote operation information received from any one of portable information devices 200, 200A, 200B.

MFP 100 transmits setting information in response to the setting screen stored in the setting screen storage area in RAM 114 being updated after the remote operation information is received. Among portable information devices 200, 200A, 200B, the remote operation device that has transmitted the remote operation information then displays the updated setting screen.

When the setting value stored in the setting value storage area in RAM 114 is changed, MFP 100 updates the setting screen stored in the setting screen storage area and, if the operation input to operation unit 163 or the operation specified based on the remote operation information is a screen transition operation, generates the setting screen specified by the screen transition operation based on the setting value stored in the setting value storage area, and updates the setting screen stored in the setting screen storage area with the generated setting screen. The setting screen stored in the setting screen storage area thus can be updated every time the setting value is updated.

When the operation specified based on the remote operation information is a screen transition operation, the setting screen specified by the screen transition operation is generated based on the setting value stored in the setting value storage area, and the setting screen stored in the setting screen storage area is updated with the generated setting screen. When the operation specified based on the remote operation information is a setting operation, the setting value stored in the setting value storage area is changed. The setting screen stored in the setting screen storage area is thus updated every time the setting value is updated by the operation specified based on the remote operation information received from any one of portable information devices 200, 200A, 200B or every time a screen transition operation is specified based on the remote operation information. The updated setting screen thus can be transmitted to the remote operation device every time remote operation information is received from the remote operation device that has transmitted the remote operation information, among portable information devices 200, 200A, 200B.

In response to reception of a job ticket from any one of portable information devices 200, 200A, 200B, MFP 100 processes data included in the job ticket in accordance with the setting value included in the job ticket. The data received from any one of portable information devices 200, 200A, 200B thus can be processed.

In response to reception of remote operation information from any one of portable information devices 200, 200A, 200B, MFP 100 stores a set of the setting value stored in the setting value storage area in RAM 114 and the screen identification information of the setting screen stored in the screen storage area into the temporary storage area in RAM 114 before the setting value stored in the setting value storage area is updated. After the setting information is transmitted to the remote operation device that has transmitted the remote operation information among portable information devices 200, 200A, 200B, MFP 100 changes the setting value stored in the setting value storage area with the setting value stored in the temporary storage area, and thereafter generates the setting screen specified by the screen identification information stored in the temporary storage area based on the setting value stored in the setting value storage area, and updates the setting screen stored in the setting screen storage area with the generated setting screen. The setting value and the setting screen stored in the setting value storage area and the setting screen storage area before the remote operation information is received thus can be stored after the setting information is transmitted after the remote operation information is received.

In response to reception of the setting information from MFP 100, each portable information device 200, 200A, 200B displays the setting screen included in the setting information on display unit 206, detects a position pointed by the user in the displayed setting screen, and transmits to MFP 100 remote operation information including the screen identification information and the setting value included in the received setting information and the positional information indicating the detected position in the setting screen. The setting information and the setting screen thus can be shared between any one of portable information devices 200, 200A, 200B and MFP 100, and when the user points on the setting screen at any one of portable information devices 200, 200A, 200B, MFP 100 can specify the operation by the user based on the position pointed by the user in the setting screen. The process for controlling MFP 100 therefore can be simplified at portable information devices 200, 200A, 200B.

Designation of data is accepted in accordance with the operation accepted by operation unit 207 at any one of portable information devices 200, 200A, 200B. In response to a predetermined operation being accepted by operation unit 207, a job ticket including the designated data and the setting value included in the setting information is transmitted to MFP 100. Portable information device 200, 200A, 200B thus can allow MFP 100 to execute the process in accordance with the setting value set in MFP 100.

Each portable information device 200, 200A, 200B stores history information including the setting screen appearing on display unit 206, the screen identification information of the setting screen, and the setting value included in the setting information into RAM 114 and displays the setting screen included in the selected history information on display unit 206 in response to an instruction to select the stored history information being accepted. In response to the position pointed by the user in the setting screen being detected, each portable information device 200, 200A, 200B transmits to MFP 100 remote operation information including the screen identification information and setting value included in the selected history information and the positional information indicating the detected position in the setting screen. The setting value and the setting screen set in MFP 100 in the past thus can be used to input a new operation to MFP 100.

Each portable information device 200, 200A, 200B stores history information including the setting screen appearing on display unit 206, the screen identification information of the setting screen, and the setting value into RAM 114 while remotely operating MFP 100. In response to the stored history information being selected, each portable information device 200, 200A, 200B displays the setting screen included in the selected history information on display unit 206 and transmits a job ticket including the designated data and the setting value included in the selected history information to MFP 100. Portable information device 200, 200A, 200B thus can allow MFP 100 to execute the process on new data using the setting value set in MFP 100 in the past.

In the foregoing embodiment, MFP 100 is taken as an example of the image forming apparatus, and portable information devices 200, 200A, 200B are taken as an example of the remote operation device. However, it is needless to say that the present invention can be understood as a remote control method that allows MFP 100 to perform the remote control process shown in FIG. 7 and FIG. 8, a remote control program that allows CPU 111 controlling MFP 100 to perform the remote control method, a remote control method that allows each portable information device 200, 200A, 200B to perform the process shown in FIG. 9, and a remote operation program that allows CPU 201 controlling each portable information device 200, 200A, 200B to perform the remote control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus remotely controlled by a remote operation device, the image forming apparatus comprising:
    a transmitter;
    a receiver;
    a storage portion including a setting value storage area for storing a setting value and a setting screen storage area for storing a setting screen; and
    a processor configured to:
    cause the transmitter to transmit to the remote operation device setting information including the setting screen stored in the screen storage area, screen identification information for identifying the setting screen, and the setting value stored in the setting value storage area,
    cause the receiver to receive from the remote operation device remote operation information including screen identification information, a setting value, and positional information indicating a position in a setting screen identified by the screen identification information, after transmission of the setting information,
    update the setting value stored in the setting value storage area with the setting value included in the remote operation information, based on the remote operation information being received;
    generate a setting screen specified by the screen identification information included in the received remote operation information, based on the setting value stored in the setting value storage area, and update the setting screen stored in the setting screen storage area with the generated setting screen, after the setting value is updated ; and
    specify an operation based on a position specified by the positional information included in the remote operation information in the updated setting screen.

2. The image forming apparatus according to claim 1, further comprising an operation accepting portion to accept an operation input by a user, wherein
    the processor is further configured to:
    if the operation accepted is a setting operation, change the setting value stored in the setting value storage area in accordance with the setting operation; and
    generate a setting screen based on the setting value stored in the setting value storage area and update the setting screen stored in the setting screen storage area with the generated setting screen.

3. The image forming apparatus according to claim 2, wherein the processor is further configured to cause the transmitter to transmit the setting information, based on the updated setting screen stored in the setting screen storage area, after the remote operation information is received.

4. The image forming apparatus according to claim 2, wherein the processor is further configured to:
    if the operation accepted by the operation accepting portion is a setting operation and the setting value stored in the setting value storage area is changed, change the setting screen stored in the setting screen storage area based on the setting value stored in the setting value storage area and update the setting screen stored in the setting screen storage area with the changed setting screen; and
    if the operation accepted by the operation accepting portion is a screen transition operation, generate a setting screen specified by the screen transition operation based on the setting value stored in the setting value storage area and update the setting screen stored in the setting screen storage area with the generated setting screen.

5. The image forming apparatus according to claim 1, wherein the processor is further configured to, if the operation specified based on the positional information included in the remote operation information, is a setting operation, change the setting value stored in the setting value storage area in accordance with the setting operation.

6. The image forming apparatus according to claim 1, further comprising a process execution portion to execute a process in accordance with the setting value stored in the setting value storage area, wherein
    the process execution portion processes the data included in the job ticket in accordance with the setting value included in the received job ticket, based on the job ticket including data to be processed and a setting value and being received from the remote operation device by the receiver.

7. The image forming apparatus according to claim 1, further comprising a temporary storage portion to temporarily store a set of the setting value stored in the setting value storage area in the storage portion and the screen identification information of the setting screen stored in the screen storage area before the setting value stored in the setting value storage area is updated based on the remote operation information being received, wherein
    the processor is further configured to:
    change the setting value stored in the setting value storage area with the setting value stored by the temporary storage portion, after the setting information is transmitted , and
    generate a setting screen specified by the screen identification information stored by the temporary storage portion based on the setting value stored in the setting value storage area and update the setting screen stored in the setting screen storage area with the generated setting screen, after the setting value stored in the setting value storage area and updated with the setting value stored in the temporary storage portion is changed.

8. The image forming apparatus according to claim 1, wherein the processor is further configured to, if the operation specified based on the positional information included in the remote operation information is a screen transition operation, generate a setting screen specified by the screen transition operation based on the setting value stored in the setting value storage area and update the setting screen stored in the setting screen storage area with the generated setting screen.

9. A remote operation device capable of remotely controlling an image forming apparatus, comprising:
    a display;
    an operation accepting portion to accept an operation by a user;
    a receiver to receive from the image forming apparatus setting information including a setting screen for remotely operating the image forming apparatus, screen identification information for identifying the setting screen, and a setting value;
    a processor configured to, based on the setting information being received, display in the display the setting screen included in the received setting information, and if the operation accepting portion accepts a user's operation of pointing on the displayed setting screen, detect a position pointed in the setting screen;

a transmitter to, based on a position in the setting screen being detected, transmit to the image forming apparatus remote operation information including the screen identification information and the setting value included in the received setting information, and positional information indicating the detected position in the setting screen; and a history storage portion to store history information including the displayed setting screen, screen identification information of the setting screen, and the setting value, wherein the processor, if the operation accepting portion accepts an instruction for selecting the stored history information, displays in the display the setting screen included in the selected history information based on the history information being selected, and the transmitter, if the history information is selected, based on a position in the setting screen being detected, transmits to the image forming apparatus, remote operation information including the screen identification information and the setting value included in the selected history information and positional information indicating the detected position in the setting screen.

10. The remote operation device according to claim 9, wherein the processor is further configured to accept designation of data in accordance with the operation accepted by the operation accepting portion; and the transmitter transmits a job ticket including the designated data and the setting value included in the received setting information to the image forming apparatus.

11. A remote operation device capable of remotely controlling an image forming apparatus, comprising:

a display;

an operation accepting portion to accept an operation by a user;

a receiver to receive from the image forming apparatus setting information including a setting screen for remotely operating the image forming apparatus, screen identification information for identifying the setting screen, and a setting value;

a processor to, based on the setting information being received, display in the display the setting screen included in the received setting information, and if the operation accepting portion accepts a user's operation of pointing on the displayed setting screen, detect a position pointed in the setting screen;

a transmitter to, based on a position in the setting screen being detected, transmit to the image forming apparatus remote operation information including the screen identification information and the setting value included in the received setting information, and positional information indicating the detected position in the setting screen; and a history storage portion to store history information including the displayed setting screen portion, screen identification information of the setting screen, and the setting value;

wherein the processor, if the operation accepting portion accepts an instruction for selecting the stored history information, displays the setting screen included in the selected history information based on the history information being selected, and the transmitter, if the history information is selected, transmits in accordance with the operation accepted by the operation accepting portion a job ticket including the designated data and the setting value included in the selected history information to the image forming apparatus.

12. A remote control method performed in an image forming apparatus remotely controlled by a remote operation device, the image forming apparatus comprising a storage portion including a setting value storage area for storing a setting value and a setting screen storage area for storing a setting screen, the method comprising:

a setting information transmitting step of transmitting to the remote operation device setting information including the setting screen stored in the screen storage area, screen identification information for identifying the setting screen, and the setting value stored in the setting value storage area, a remote operation information receiving step of receiving from the remote operation device remote operation information including screen identification information, a setting value, and positional information indicating a position in the setting screen identified by the screen identification information, after transmission of the setting information, a remote setting step of updating the setting value stored in the setting value storage area with the setting value included in the remote operation information, based on the remote operation information being received, a remote setting screen update step of generating a setting screen specified by the screen identification information included in the received remote operation information based on the setting value stored in the setting value storage area and updating the setting screen stored in the setting screen storage area with the generated setting screen, after the setting value is updated in the remote setting step, and a remote operation specifying step of specifying an operation based on a position specified by the positional information included in the remote operation information in the setting screen updated by the remote setting screen update step.

13. A non-transitory computer-readable recording medium encoded with a remote control program, the remote control program causing a computer controlling the image forming apparatus to perform the remote control method of claim 12.

14. The non-transitory computer-readable recording medium encoded with a remote control program according to claim 13, wherein the remote control program further causes the computer to perform:

an operation accepting step of accepting an operation input by a user;

a setting value change step of, if the operation accepted in the operation accepting step is a setting operation, changing the setting value stored in the setting value storage area in accordance with the setting operation; and a setting screen update step of generating a setting screen based on the setting value stored in the setting value storage area and updating the setting screen stored in the setting screen storage area with the generated setting screen.

15. The non-transitory computer-readable recording medium encoded with a remote control program according to claim 14, wherein the setting information transmitting step includes a step of transmitting the setting information based on the setting screen stored in the setting screen storage area being updated in the setting screen update step, after the remote operation information is received.

16. The non-transitory computer-readable recording medium encoded with a remote control program according to claim 14, wherein
the setting screen update step includes
a setting value reference update step of, if the setting value stored in the setting value storage area is changed, changing the setting screen stored in the setting screen storage area based on the setting value stored in the setting value storage area and updating the setting screen stored in the setting screen storage area with the changed setting screen, and
an operation reference update step of, if the operation accepted in the operation accepting step is a screen transition operation, generating a setting screen specified by the screen transition operation based on the setting value stored in the setting value storage area and updating the setting screen stored in the setting screen storage area with the generated setting screen.

17. The non-transitory computer-readable recording medium encoded with a remote control program according to claim 13, wherein the remote control program further causes the computer to perform
a remote setting value change step of, if the operation specified in the remote operation specifying step is a setting operation, changing the setting value stored in the setting value storage area in accordance with the setting operation.

18. The non-transitory computer-readable recording medium encoded with a remote control program according to claim 13, wherein
the remote control program further causes the computer to perform:
a process execution step of executing a process in accordance with the setting value stored in the setting value storage area,
a job ticket receiving step of receiving a job ticket including data to be processed and a setting value from the remote operation device, and
the process execution step includes a step of processing the data included in the job ticket in accordance with the setting value included in the received job ticket, in response to the job ticket being received.

19. The non-transitory computer-readable recording medium encoded with a remote control program according to claim 13, wherein
the image forming apparatus further includes a temporary storage portion, and
the remote control program further causes the computer to perform
a temporary storage step of temporarily storing in said temporary storage portion a set of the setting value stored in the setting value storage area in the storage portion and the screen identification information of the setting screen stored in the screen storage area before the setting value stored in the setting value storage area is updated in the remote setting step, based on the remote operation information being received, wherein
a setting value restore step of changing the setting value stored in the setting value storage area with the setting value stored in the temporary storage step, after the setting information is transmitted in the setting information transmitting step, and
a setting screen restore step of generating a setting screen specified by the screen identification information stored in the temporary storage step based on the setting value stored in the setting value storage area and updating the setting screen stored in the setting screen storage area with the generated setting screen, after the setting value is changed in the setting value restore step.

20. The non-transitory computer-readable recording medium encoded with a remote control program according to claim 13, wherein the remote control program further causes the computer to perform a remote setting screen change step of, if the operation specified in the remote operation specifying step is a screen transition operation, generating a setting screen specified by the screen transition operation based on the setting value stored in the setting value storage area, and updating the setting screen stored in the setting screen storage area with the generated setting screen.

21. A non-transitory computer-readable recording medium encoded with a remote operation program, wherein the remote operation program causes a computer controlling a remote operation device capable of remotely controlling an image forming apparatus to perform:
an operation accepting step of accepting an operation by a user;
a setting information receiving step of receiving from the image forming apparatus setting information including a setting screen for remotely operating the image forming apparatus, screen identification information for identifying the setting screen, and a setting value;
a setting screen display step of, in response to the setting information being received, displaying the setting screen included in the received setting information;
a position detection step of, if a user's operation of pointing on the setting screen displayed in the setting screen display step is accepted in the operation accepting step, detecting a position pointed in the setting screen; and
a remote operation transmitting step of, in response to a position in the setting screen being detected in the position detection step, transmitting to the image forming apparatus remote operation information including the screen identification information and the setting value included in the received setting information and positional information indicating the detected position in the setting screen;
a history storage step of storing history information including the setting screen displayed in the setting screen display step, screen identification information of the setting screen, and the setting value; and
a history update step of accepting an instruction to select the stored history information, wherein
the setting screen display step includes a step of displaying the setting screen included in the selected history information based on the history, information being selected, and
if the history information is selected, the job ticket transmitting step includes a step of, based on a position in the setting screen being detected in the position detection step, transmitting to the image forming apparatus remote operation information including the screen identification information and the setting value included in the selected history information and positional information indicating the detected position in the setting screen.

22. The non-transitory computer-readable recording medium encoded with a remote operation program according to claim 21, wherein the remote operation program further causes the computer to perform:

a data designation accepting step of accepting designation of data in accordance with the operation accepted in the operation accepting step; and a job ticket transmitting step of, based on a predetermined operation being accepted in the operation accepting step, transmitting a job ticket including the designated data and the setting value included in the received setting information to the image forming apparatus.

23. A non-transitory computer-readable recording medium encoded with a remote operation program, wherein the remote operation program causes a computer controlling a remote operation device capable of remotely controlling an image forming apparatus to perform:

an operation accepting step of accepting an operation by a user;

a setting information receiving step of receiving from the image forming apparatus setting information including a setting screen for remotely operating the image forming apparatus, screen identification information for identifying the setting screen, and a setting value;

a setting screen display step of, in response to the setting information being received, displaying the setting screen included in the received setting information;

a position detection step of, if a user's operation of pointing on the setting screen displayed in the setting screen display step is accepted in the operation accepting step, detecting a position pointed in the setting screen; and a remote operation transmitting step of, in response to a position in the setting screen being detected in the position detection step, transmitting to the image forming apparatus remote operation information including the screen identification information and the setting value included in the received setting information and positional information indicating the detected position in the setting screen;

a history storage step of storing history information including the setting screen displayed in the setting screen display step, screen identification information of the setting screen, and the setting value; and a history update step of accepting an instruction to select the stored history information, wherein the setting screen display step includes a step of based on the history information based on the history information being selected, displaying the setting screen included in the selected history information, and if the history information is selected, the job ticket transmitting step includes a step of transmitting a job ticket including the designated data and the setting value included in the selected history information to the image forming apparatus.

* * * * *